United States Patent
Shinada et al.

(10) Patent No.: US 9,980,143 B2
(45) Date of Patent: May 22, 2018

(54) COMMUNICATION SYSTEM, BASE STATION, AND TERMINAL

(71) Applicant: FUJITSU LIMITED, Kawasaki-shi, Kanagawa (JP)

(72) Inventors: Yuki Shinada, Saitama (JP); Noboru Hasegawa, Oota (JP); Katsuyuki Masuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 15/139,044

(22) Filed: Apr. 26, 2016

(65) Prior Publication Data

US 2016/0337860 A1 Nov. 17, 2016

(30) Foreign Application Priority Data

May 13, 2015 (JP) ................. 2015-097989

(51) Int. Cl.
| | | |
|---|---|---|
| *H04W 12/08* | (2009.01) | |
| *H04W 36/14* | (2009.01) | |
| *H04W 12/02* | (2009.01) | |
| *H04W 12/04* | (2009.01) | |
| *H04W 72/04* | (2009.01) | |
| *H04L 29/06* | (2006.01) | |

(52) U.S. Cl.
CPC ........... *H04W 12/08* (2013.01); *H04W 12/02* (2013.01); *H04W 36/14* (2013.01); *H04W 72/048* (2013.01); *H04L 63/168* (2013.01); *H04W 12/04* (2013.01); *H04W 72/0453* (2013.01)

(58) Field of Classification Search
CPC ... H04W 12/08; H04W 72/048; H04W 12/02; H04W 36/14; H04W 72/0453; H04W 12/04; H04L 63/168
See application file for complete search history.

(56) References Cited

U.S. PATENT DOCUMENTS

| | | | |
|---|---|---|---|
| 8,660,536 B1* | 2/2014 | Pogue | H04W 88/10 455/411 |
| 9,173,158 B2* | 10/2015 | Varma | H04W 40/36 |
| 2011/0044245 A1* | 2/2011 | Hasegawa | H04W 88/08 370/328 |
| 2012/0122448 A1* | 5/2012 | Mueck | H04W 28/24 455/424 |
| 2013/0219166 A1* | 8/2013 | Ristov | H04L 63/0823 713/151 |

(Continued)

FOREIGN PATENT DOCUMENTS

| | | |
|---|---|---|
| JP | 2013-140459 A | 7/2013 |
| JP | 2014-109882 A | 6/2014 |

(Continued)

*Primary Examiner* — Hashim Bhatti
(74) *Attorney, Agent, or Firm* — Arent Fox LLP

(57) ABSTRACT

A communication system including: a terminal, and a base station configured to wirelessly couple to the terminal using a first frequency band, wherein a second frequency band is used for wirelessly coupling the base station to the terminal instead of the first frequency band only when a specified application program executed in the terminal communicates only with a specified network via the base station, the second frequency band being used for communication between the specified application program and the specified application program.

11 Claims, 27 Drawing Sheets

(56) References Cited

U.S. PATENT DOCUMENTS

| | | | |
|---|---|---|---|
| 2013/0288668 A1* | 10/2013 | Pragada | H04W 12/06 455/426.1 |
| 2014/0156952 A1 | 6/2014 | Takeda | |
| 2015/0110089 A1* | 4/2015 | Pazhyannur | H04W 48/18 370/338 |
| 2015/0119064 A1* | 4/2015 | Takano | H04W 28/16 455/454 |
| 2015/0237560 A1* | 8/2015 | Saida | H04W 36/365 370/331 |
| 2015/0350953 A1* | 12/2015 | Himayat | H04W 40/02 370/235 |
| 2016/0034699 A1 | 2/2016 | Sasaki | |
| 2016/0050567 A1 | 2/2016 | Asano et al. | |
| 2016/0227416 A1* | 8/2016 | Suzuki | H04W 72/0453 |
| 2016/0314419 A1* | 10/2016 | White | G06Q 10/06311 |
| 2017/0223698 A1* | 8/2017 | Niu | H04W 72/0413 |

FOREIGN PATENT DOCUMENTS

| | | |
|---|---|---|
| JP | 2014-187449 A | 10/2014 |
| JP | 2014-187453 A | 10/2014 |

\* cited by examiner

FIG. 9

| USE FREQUENCY (MHz) | APPLICATION NAME |
|---|---|
| aaaa TO bbbb | APPLICATION A | t1

FIG. 10

| ENCRYPTION KEY | APPLICATION NAME |
|---|---|
| pppppppp | APPLICATION A | t2

FIG. 17

| ITEM NUMBER | USE FREQUENCY (MHz) | APPLICATION NAME |
|---|---|---|
| 1 | aaaa TO bbbb | APPLICATION A |
| 2 | cccc TO dddd | APPLICATION B |
| 3 | eeee TO ffff | APPLICATION C |
| 4 | gggg TO hhhh | APPLICATION D | t3

FIG. 18

| ITEM NUMBER | APPLICATION NAME | USER |
|---|---|---|
| 1 | APPLICATION A | USER 1, USER 2 |
| 2 | APPLICATION B | USER 3 |
| 3 | APPLICATION C | USER 4, USER 5 |
| 4 | APPLICATION D | USER 6, USER 7, USER 8 | t4

FIG. 19

| ITEM NUMBER | ENCRYPTION KEY | APPLICATION NAME |
|---|---|---|
| 1 | pppppppp | APPLICATION A |
| 2 | qqqqqqqq | APPLICATION B |
| 3 | rrrrrrrr | APPLICATION C |
| 4 | ssssssss | APPLICATION D | t5

FIG. 22

| ITEM NUMBER | ROUTE INFORMATION | APPLICATION NAME | IN-COMPANY NETWORK ADDRESS |
|---|---|---|---|
| 1 | ROUTE 1 | APPLICATION A | aaa.aaa.aaa.aaa |
| 2 | ROUTE 2 | APPLICATION B | bbb.bbb.bbb.bbb |
| 3 |  | APPLICATION C | ccc.ccc.ccc.ccc |
| 4 |  | APPLICATION D | ddd.ddd.ddd.ddd | t6

COMMUNICATION SYSTEM, BASE STATION, AND TERMINAL

CROSS-REFERENCE TO RELATED APPLICATION

This application is based upon and claims the benefit of priority of the prior Japanese Patent Application No. 2015-097989, filed on May 13, 2015, the entire contents of which are incorporated herein by reference.

FIELD

The embodiments discussed herein are related to communication systems.

BACKGROUND

In recent years, a way of use of mobile machines called personal mobile use has attracted attention. In personal mobile use, for example, an employee uses his or her own mobile machine for business. Such a way of use of mobile machines may be referred to, for example, bring your own device (BYOD).

For example, personal mobile use may reduce cost that would be incurred if a company provides employees with mobile machines. Also, personal mobile use allows, for example, the employees to access a system and database of the company even from the outside of the premises of the company, thereby enhancing productivity of the employees.

Examples of technology as described above include the following.

That is, there is a network-system-related technology using smartphones in which a terminal encrypts an application with a predetermined encryption scheme and communicates with a server of a company.

According to this technology, security measures may be implemented even when smartphones are used for business.

Also, there is an information-processing-device-related technology in which an area in a memory accessible by an information processing device is switched depending on mode.

According to this technology, security measures may be taken in accordance with the use purpose.

Furthermore, there is an information-management-method-related technology in which application for use permission is made to a server in a company by using position information of a portable terminal or biological information of a user.

According to this technology, the occurrence of information leakage due to coexistence of business use and personal use of the portable terminal may be reduced.

Japanese Laid-open Patent Publications Nos. 2013-140459, 2014-109882, and 2014-187449 are examples of related art.

SUMMARY

According to an aspect of the invention, a communication system including: a terminal, and a base station configured to wirelessly couple to the terminal using a first frequency band, wherein a second frequency band is used for wirelessly coupling the base station to the terminal instead of the first frequency band only when a specified application program executed in the terminal communicates only with a specified network via the base station, the second frequency band being used for communication between the specified application program and the specified application program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram depicting an example of a frequency information table of the mobile machine;

FIG. 10 is a diagram depicting an example of an encryption key information table of the mobile machine;

FIG. 17 is a diagram depicting an example of a frequency information table of the base station device;

FIG. 18 is a diagram depicting an example of a user information table of the base station device;

FIG. 19 is a diagram depicting an example of an encryption key information table of the base station device;

FIG. 22 is a diagram depicting an example of a route information table of the communication route control device;

DESCRIPTION OF EMBODIMENTS

Personal mobile use has a problem with, for example, security. In personal mobile use, for example, an employee accesses a system of a company. The system of the company may include, for example, information such as trade secrets and personal information, leakage of which would generally pose a problem. For example, when a mobile machine accesses a system in a company via a public network, information such as trade secrets and personal information flows through the public network. Moreover, in the public network, for example, a wireless base station device and a mobile machine wirelessly communicate with each other, and therefore information such as trade secrets and personal information flows through a wireless zone.

In the wireless zone, packets transmitted and received may be intercepted in a range where, for example, radio waves are reachable. For example, once a packet is intercepted, information in the packet may possibly be exploited, and security may not be maintained.

In the network-system-related technology using smartphones described above, application encryption is performed. However, a packet may be intercepted in a wireless zone to cause leakage of information included in the packet, and security may not be maintained.

Moreover, in the information-processing-device-related technology described above, process of switching the accessible memory area is performed. However, since information flowing through a wireless zone is the same, if a packet is intercepted, information included in the packet is leaked, and security may not be maintained.

Furthermore, in the information-management-method-related technology described above, an application for use permission is made to a server by using position information of a portable terminal or the like. However, if a packet is intercepted in a wireless zone, information included in the packet may be leaked, and security may not be maintained.

That is, in these technologies, any measures against interception of a packet in a wireless zone are not taken. If a packet is intercepted in a wireless zone, information included in the packet may be leaked, and security may not be maintained.

It is desirable to provide a communication system which improves security.

In the following, embodiments are described.

First Embodiment

Figure 1:
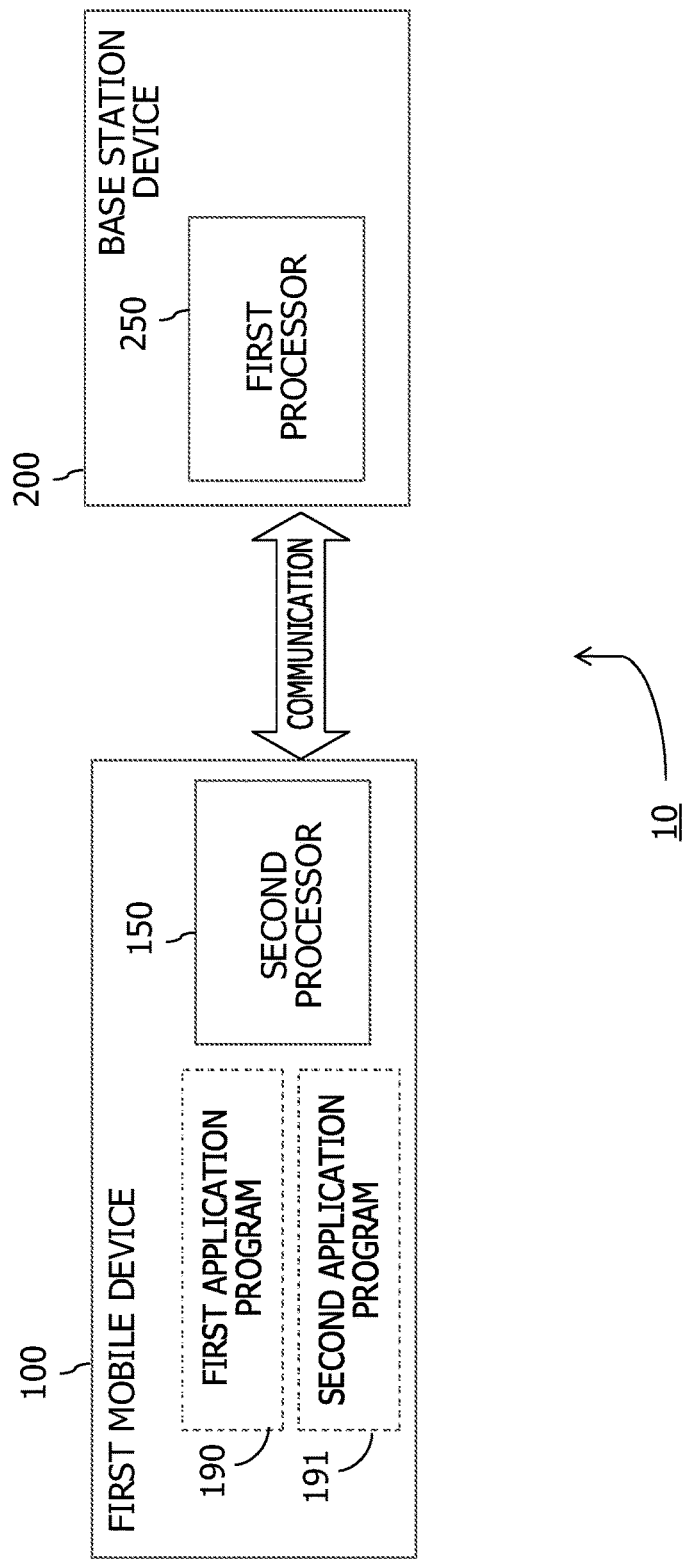
FIG. 1 is a diagram depicting an example of structure of a communication system.

First, a first embodiment is described. FIG. 1 is a diagram depicting an example of structure of a communication system 10.

The communication system 10 includes a first mobile device 100 and a base station device 200.

The first mobile device 100 includes a first application program 190, a second application program 191, and a second processor 150. The first mobile device 100 is, for example, a communication device such as a smartphone or tablet terminal, and wirelessly communicates with the base station device 200.

The first application program 190 and the second application program 191 are, for example, programs to be executed by the second processor 150. For example, by being executed, the first application program 190 and the second application program 191 access a network or system of a company. Also, for example, at the start of use, the first application program 190 and the second application program 191 may perform login process such as prompting a user to input a login name or password and allowing use when a correct input is provided. For example, a mobile device owned by a user working for the company may be registered in advance on a company's system or the like, and the first application program 190 and the second application program 191 may be restricted so as not be usable by devices other the registered mobile device.

For example, the second processor 150 wirelessly communicates with the base station device 200. Also, for example, the second processor 150 executes the first application program 190 and the second application program 191, by user operation.

The base station device 200 includes a first processor 250.

For example, the first processor 250 wirelessly communicates with the first mobile device 100.

When the second processor 150 of the first mobile device 100 executes, for example, the first application program 190, communication with the base station device 200 starts. When performing communication with the base station device 200 by executing the first application program 190, the second processor 150 uses a first frequency (or a first frequency band).

Also, when the second processor 150 executes, for example, the second application program 191, communication with the base station device 200 starts. When performing communication with the base station device 200 by executing the second application program 191, the second processor 150 uses a second frequency (or a second frequency band).

When the second processor 150 of the mobile device 100 communicates with the base station device 200 by executing the first application program 190, the first processor 250 of the base station device 200 uses the first frequency. Also, when the second processor 150 of the mobile device 100 communicates with the base station device 200 by executing the second application program 191, the first processor 250 of the base station device 200 uses the second frequency.

The first and second frequencies may be, for example, stored in advance in internal memories of the first mobile device 100 and the base station device 200. Alternatively, the first and second frequencies may be, for example, determined by the first processor 250 of the base station device 200 and reported to the first mobile device 100.

Also, while the first mobile device 100 includes the first application program 190 and the second application program 191 in FIG. 1, different communication devices may include respective programs.

In this manner, by the mobile device changing the frequency for use in wireless communication for each application for use, for example, a dedicated frequency may be allocated to an application for business use. With this, the application for business use may use a dedicated frequency separately from frequencies for use by other general communication devices, thereby reducing data coexistence in a wireless zone. That is, data is less prone to be intercepted in a wireless zone, thereby improving security of the communication system 10.

Also, by allocating a dedicated frequency to the application for business use, the occurrence of interference with wireless communication of general communication devices may be reduced, and stable communication with less interference may be performed. Furthermore, by restricting users permitted to use the business application, the number of mobile devices using the dedicated frequency may be restricted, and stable communication may be ensured.

Second Embodiment

Figure 2:
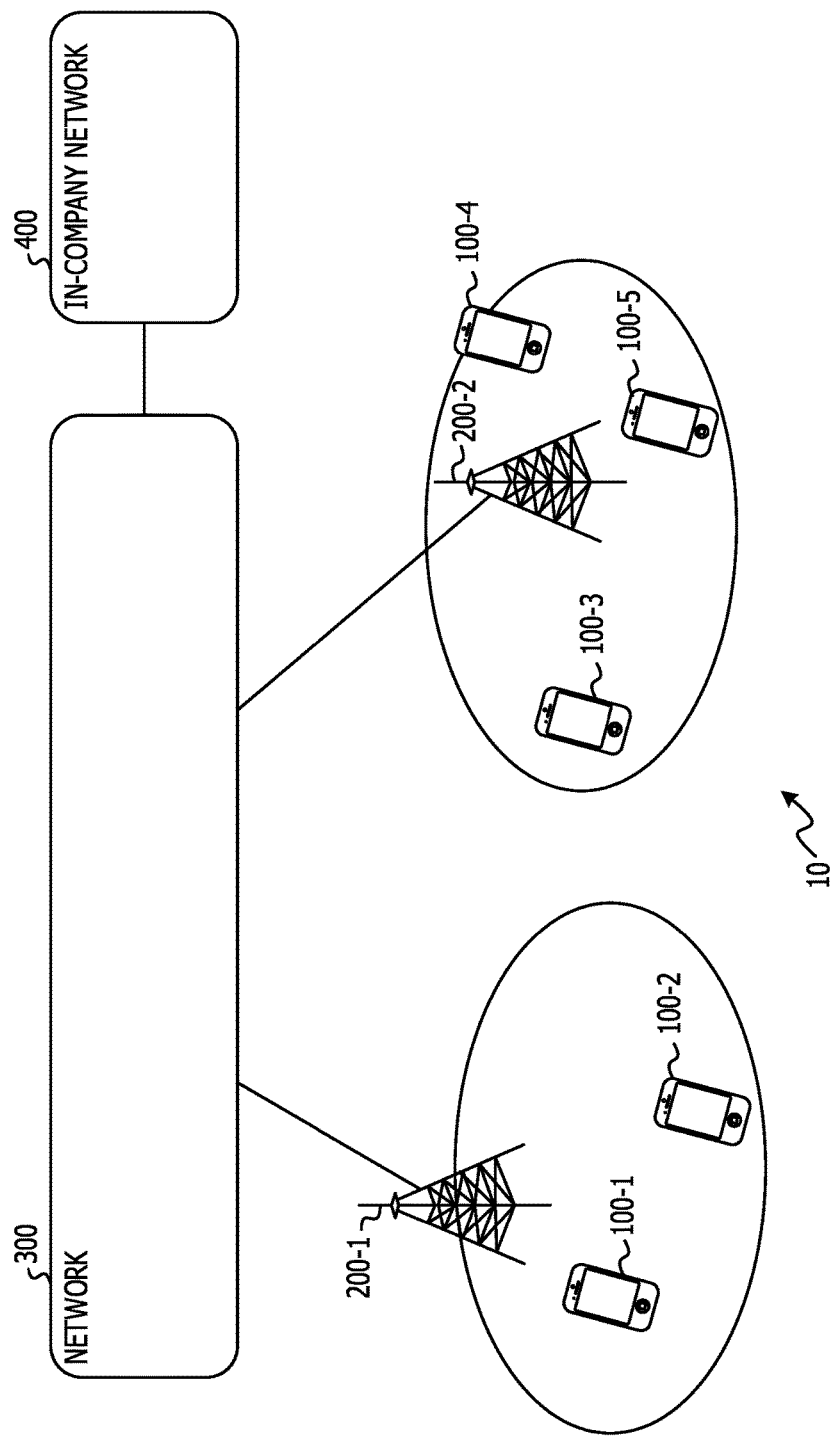
FIG. 2 is a diagram depicting an example of structure of the communication system.
Figure 3:
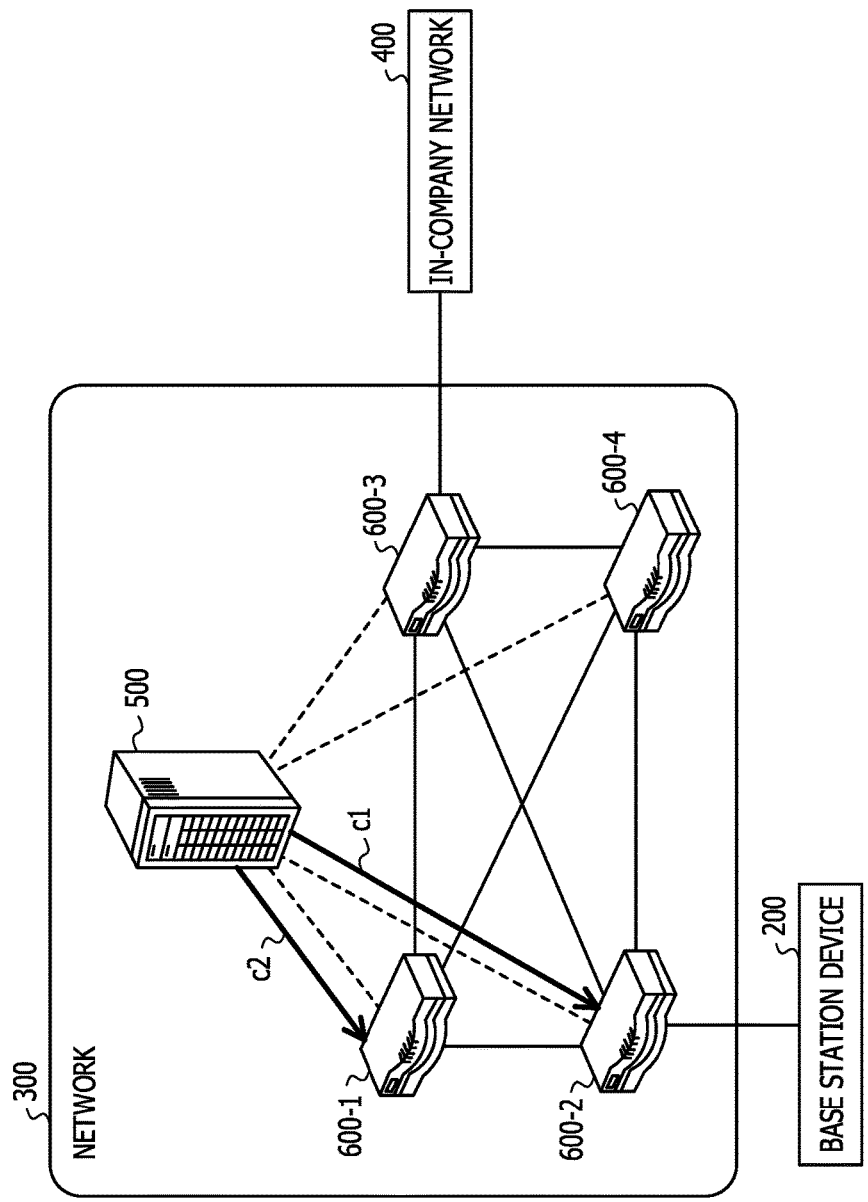
FIG. 3 is a diagram depicting an example of structure of a network.

Next, a second embodiment is described.
<Example of Structure of the Communication System>
An example of structure of the communication system 10 is described. FIG. 2 is a diagram depicting an example of structure of the communication system 10. FIG. 3 is a diagram depicting an example of structure of a network 300.

The communication system 10 includes mobile machines 100-1 to 100-5, base station devices 200-1 and 200-2, the network 300, and an in-company network 400.

The mobile machines 100-1 to 100-5 are, for example, communication devices such as smartphones or tablet devices. The mobile machines 100-1 to 100-5 wirelessly communicate with, for example, the base station devices 200-1 and 200-2. For example, when using an application incorporated therein, the mobile machines 100-1 to 100-5 connect (or couple) to the base station devices 200-1 and 200-2 for packet transmission and reception to and from the network 300. Also, for example, when connecting to the in-company network 400 via the network 300 by using a business application, the mobile machines 100-1 to 100-5 notify the base station devices 200-1 and 200-2 of the use of the business application. In the following, the mobile machines 100-1 to 100-5 may be referred to as a mobile machine 100 without making a distinction thereamong. Also, the mobile machines 100-1 to 100-5 may be referred to as a mobile device.

For example, the base station devices 200-1 and 200-2 wirelessly communicate with the mobile machines 100-1 to 100-5. Also, for example, the base station devices 200-1 and 200-2 are connected by wire to the network 300 to communicate with the network 300. For example, when communicating with the mobile machine 100, the base station devices 200-1 and 200-2 indicate to the mobile machine 100 a radio frequency for use in communication. For example, when notified by the mobile machine 100 that a business application is used, the base station devices 200-1 and 200-2 instruct the mobile machine 100 to use a frequency in accordance with the business application. Also, for example, when notified by the mobile machine 100 that a business application is used, the base station devices 200-1 and 200-2 notify a communication route control device 500 of the network 300 that the business application is used. In the following, the base station devices 200-1 and 200-2 may be referred to as a base station device 200 without making a distinction therebetween.

The network 300 is, for example, a portable telephone network provided by a communication carrier. The network 300 connects to, for example, the base station device 200 and the in-company network 400. The network 300 includes the communication route control device 500 and switches 600-1 to 600-4. For example, the communication route control device 500 and the switches 600-1 to 600-4 are mutually connected by wire.

The communication route control device 500 is, for example, a device which manages a communication route in the network 300. The communication route control device 500 is, for example, a network controller. The communication route control device 500 instructs, for example, the switches 600-1 to 600-4 which of the switches 600-1 to 600-4 a packet addressed to a specific destination is to be transmitted to. For example, the communication route control device 500 instructs the switch 600-2 to transmit a packet addressed to the in-company network 400 to the switch 600-1 (c1). Similarly, the communication route control device 500 instructs the switch 600-1 to transmit a packet addressed to the in-company network 400 to the switch 600-3 (c2). By setting the switches 600-1 to 600-4 in this manner, a communication route for a packet addressed to a specific destination may be determined. For example, upon receiving from the base station device 200 a packet addressed to the in-company network 400, the switch 600-2 transmits the received packet to the switch 600-1. The switch 600-1 receiving the packet addressed to the in-company network 400 transmits the packet to the switch 600-3. The switch 600-3 receiving the packet addressed to the in-company network 400 transmits the packet to the in-company network 400, which is the destination. That is, the packet addressed to the in-company network 400 received from the base station device 200 passes through a communication route, for example, from the switch 600-2, the switch 600-1, and then the switch 600-3.

The switches 600-1 to 600-4 are, for example, packet relay devices which each transmit a received packet to another one of the switches 600-1 to 600-4 or to a packet destination. For example, by following an instruction from the communication route control device 500, the switches 600-1 to 600-4 determine a packet transmission destination. Also, for example, when no instruction is provided from the communication route control device 500, the switches 600-1 to 600-4 may transmit a packet to one of the switches 600-1 to 600-4 closest to the destination or to one of the switches 600-1 to 600-4 with the smallest traffic volume. In the following, the switches 600-1 to 600-4 may be referred to as a switch 600 without making a distinction thereamong.

The in-company network 400 is, for example, a local network constructed in a company. For example, the in-company network 400 is connected to the network 300 by wire.

Figure 4:
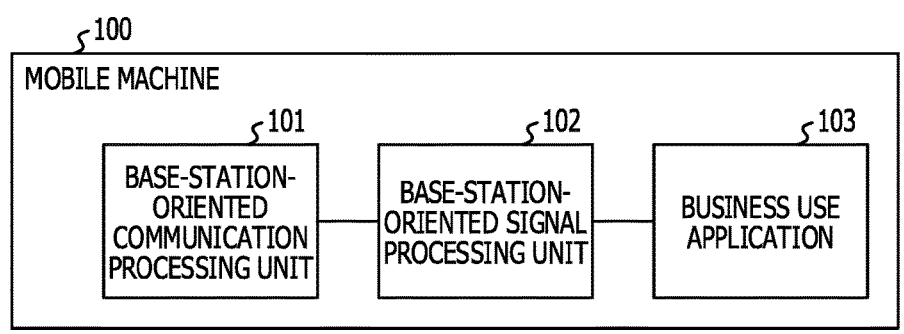
FIG. 4 is a diagram depicting an example of functional structure of a mobile machine.

<Example of Functional Structure of the Mobile Machine>
An example of functional structure of the mobile machine 100 is described. FIG. 4 is a diagram depicting an example of functional structure of the mobile machine 100.

The mobile machine 100 includes a base-station-oriented communication processing unit 101, a base-station-oriented signal processing unit 102, and a business use application 103.

The base-station-oriented communication processing unit 101 is, for example, an interface with the base station device 200, and wirelessly transmits and receives a packet to and from the base station device 200. For example, the base-station-oriented communication processing unit 101 performs communication by using a radio frequency allocated by the base station device 200. For example, the base-station-oriented communication processing unit 101 performs frequency conversion process and demodulation process on a packet received from the base station device 200, and outputs the result to the base-station-oriented signal processing unit 102. Also, the base-station-oriented communication processing unit 101 performs modulation process and frequency conversion process on a signal received from the base-station-oriented signal processing unit 102, and transmits the result to the base station device 200.

For example, the base-station-oriented signal processing unit 102 terminates a protocol in communication between the base station device 200 and the mobile machine 100. For example, the base-station-oriented signal processing unit 102 converts a packet received from the base station device 200 into a signal in an internal format of the mobile machine 100 and converts a signal in the internal format into a signal in a format for transmission to the base station device 200.

The business use application 103 is, for example, an application to be used by a user of the mobile machine 100 when accessing a network or system of a company the user is working for. The network and system of the company include, for example, information generally managed by the company so as not be leaked, such as information related to trade secrets. For example, the business use application 103 is installed on the mobile machine 100. For example, the business use application 103 performs login process at the start of use.

<Example of Functional Structure of the Base Station Device>

Figure 5:
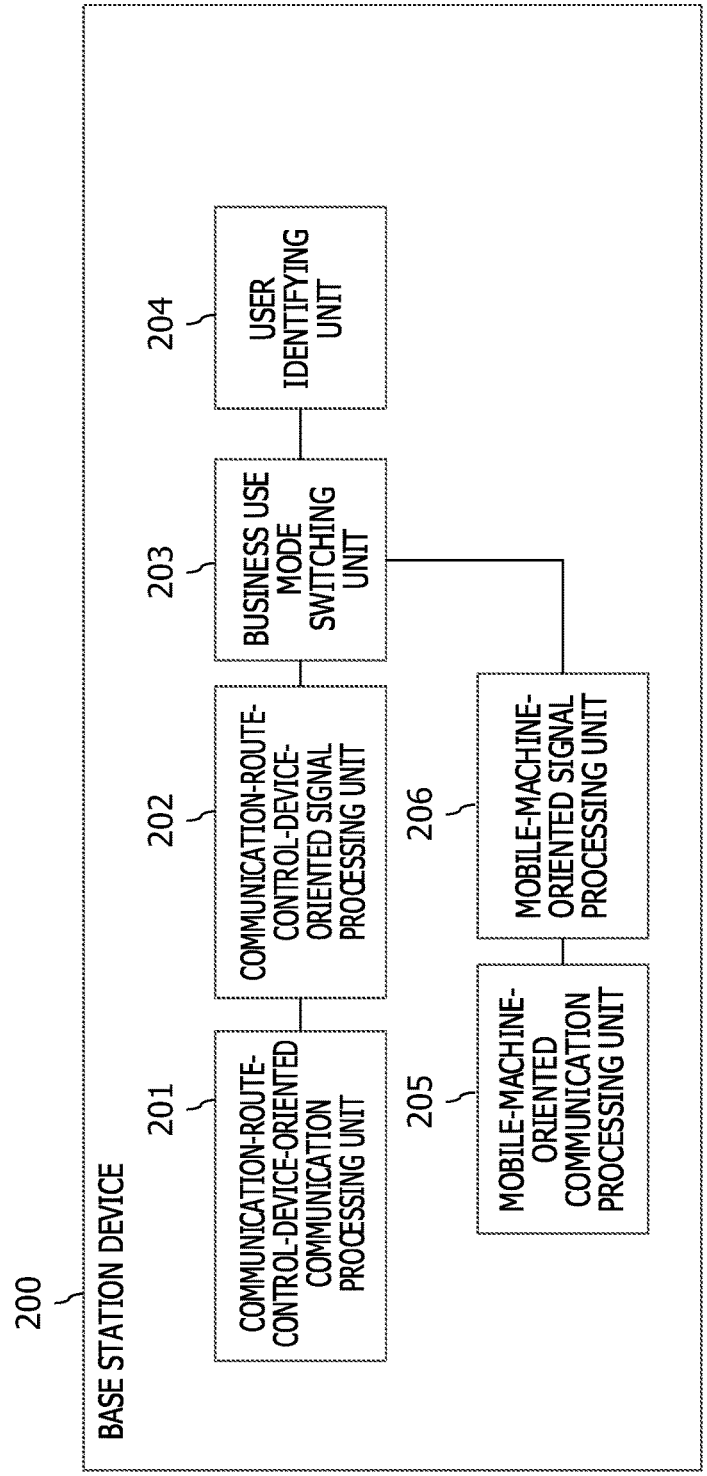
FIG. 5 is a diagram depicting an example of functional structure of a base station device.

An example of functional structure of the base station device 200 is described. FIG. 5 is a diagram depicting an example of functional structure of the base station device 200.

The base station device 200 includes a communication-route-control-device-oriented communication processing unit 201, a communication-route-control-device-oriented signal processing unit 202, a business use mode switching unit 203, a user identifying unit 204, a mobile-machine-oriented communication processing unit 205, and a mobile-machine-oriented signal processing unit 206.

The communication-route-control-device-oriented communication processing unit 201 is, for example, an interface with the communication route control device 500, and transmits and receives a packet to and from the communication route control device 500 by wire. For example, the communication-route-control-device-oriented communication processing unit 201 transmits and receives a packet and command to and from the communication route control device 500.

For example, the communication-route-control-device-oriented signal processing unit 202 terminates a protocol in communication between the base station device 200 and the communication route control device 500. For example, the communication-route-control-device-oriented signal processing unit 202 converts a packet received from the communication route control device 500 into a signal in an internal format of the base station device 200 or converts a signal in the internal format into a format for transmission to the communication route control device 500.

For example, by following an instruction from the communication route control device 500, the business use mode switching unit 203 switches to a business use mode. The business use mode is a mode in which, for example, a frequency for use by the business use application 103 is not allocated to a mobile machines other than the mobile machine 100 using the business use application 103.

For example, the user identifying unit 204 manages the mobile machine 100 using the business use application 103. The user identifying unit 204 manages, for example, an identifier which allows the mobile machine 100 to be uniquely identified, such as an international mobile equipment identity (IMEI) of the mobile machine 100 using the business use application 103.

The mobile-machine-oriented communication processing unit 205 is, for example, an interface with the mobile machine 100, and wirelessly transmits and receives a packet to and from the mobile machine 100. For example, the mobile-machine-oriented communication processing unit 205 transmits and receives a packet and command to and from the mobile machine 100. For example, the mobile-machine-oriented communication processing unit 205 performs frequency conversion process and demodulation process on a packet received from the mobile machine 100, and outputs the result to the mobile-machine-oriented signal processing unit 206. Also, the mobile-machine-oriented communication processing unit 205 performs modulation process and frequency conversion process on a signal received from the mobile-machine-oriented signal processing unit 206, and transmits the result to the mobile machine 100.

For example, the mobile-machine-oriented signal processing unit 206 terminates a protocol in communication between the base station device 200 and the mobile machine 100. For example, the mobile-machine-oriented signal processing unit 206 converts a packet received from the mobile machine 100 into a signal in an internal format of the base station device 200 and converts a signal in the internal format into a signal in a format for transmission to the mobile machine 100.

<Example of Functional Structure of the Communication Route Control Device>

Figure 6:
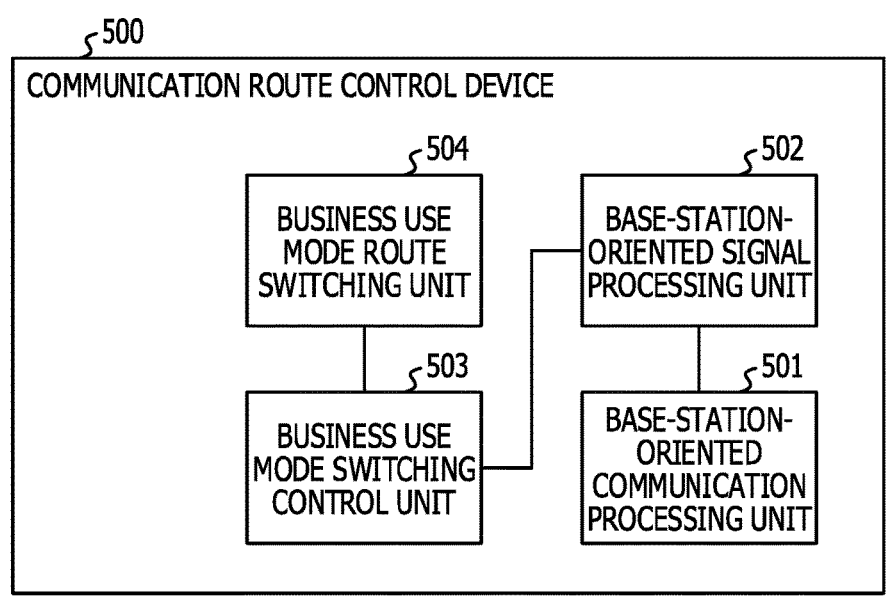
FIG. 6 is a diagram depicting an example of functional structure of a communication route control device.

An example of functional structure of the communication route control device 500 is described. FIG. 6 is a diagram depicting an example of functional structure of the communication route control device 500.

The communication route control device 500 is a device configuring the network 300, and includes a base-station-oriented communication processing unit 501, a base-station-oriented signal processing unit 502, a business use mode switching control unit 503, and a business use mode route switching unit 504.

The base-station-oriented communication processing unit 501 is, for example, an interface with the base station device 200, and transmits and receives a packet to and from the base station device 200 by wire. For example, the base-station-oriented communication processing unit 501 transmits and receives a command and packet to and from the base station device 200.

For example, the base-station-oriented signal processing unit 502 terminates a protocol in communication between the base station device 200 and the communication route control device 500. For example, the base-station-oriented signal processing unit 502 converts a packet received from the base station device 200 into a signal in an internal format of the communication route control device 500 and converts a signal in the internal format into a format for transmission to the base station device 200.

For example, the business use mode switching control unit 503 manages a communication route in the business use mode. For example, at the start of business use, the business use mode switching control unit 503 requests the business use mode route switching unit 504 to create a dedicated route for business use. Also, for example, at the end of business use, the business use mode switching control unit 503 requests the business use mode route switching unit 504 to free the dedicated route for business use.

For example, the business use mode route switching unit 504 creates and frees a communication route in the network 300. For example, in creating and freeing a communication route, the business use mode route switching unit 504 issues an instruction to the switch 600.

<Entire Sequence at the Start of Business Use>

Figure 7:
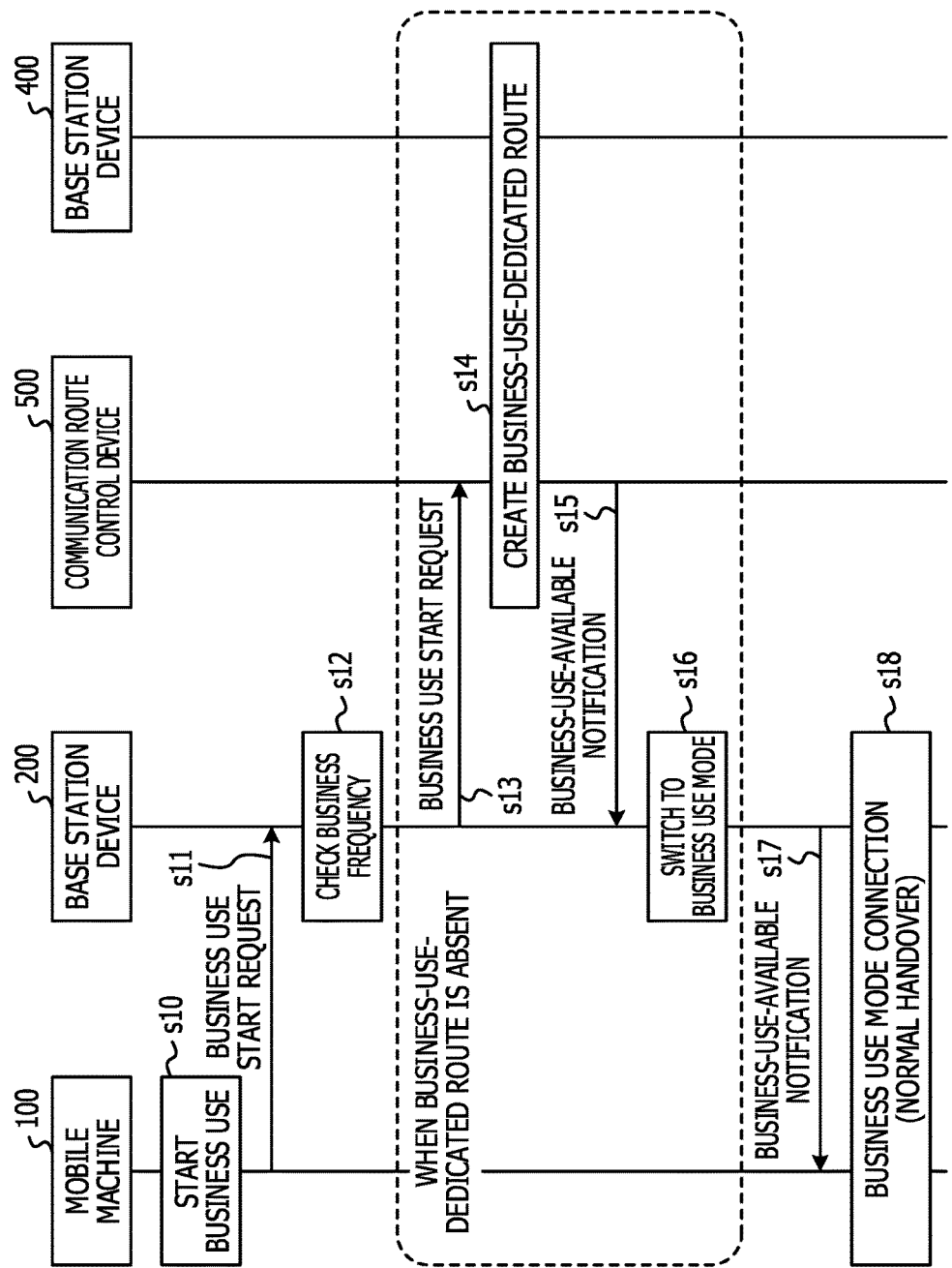
FIG. 7 is a diagram depicting an example of an entire sequence.

An entire sequence of the communication system 10 when business use is started is described. FIG. 7 is a diagram depicting an example of the entire sequence of the communication system 10 at the start of business use.

In the mobile machine 100, business use starts (s10). The start of business use is performed by, for example, the user starting the business use application 103 and completing login process. At the start of business use, the mobile machine 100 transmits a business use start request to the base station device 200 (s11). The business use start request includes, for example, information about the application name and identifier of the business use application 103. The identifier may be, for example, able to uniquely identify the mobile machine 100, such as IMEI, or may be a login name for use in login of the business use application 103.

Upon receiving the business use start request, the base station device 200 checks a business frequency (s12). Checking a business frequency is a process of checking, for example, whether a frequency corresponding to the business use application 103 included in the business use start request has been allocated. If the frequency corresponding to the business use application 103 included in the business use start request has been allocated, the base station device 200 determines that there is a business-use-dedicated route, and transmits a business-use-available notification to the mobile machine 100 (s17). The business-use-available notification includes, for example, a frequency available to the mobile machine 100 and information about an encryption key for use in communication. Note that, for example, when the business use application 103 is running, the mobile machine 100 may impose a restriction so that an application for communication with the base station device 200 is not started.

Upon transmitting the business-use-available notification, the base station device 200 performs handover process if there is a mobile machine using the frequency for use in communication of the business use application 103 (s18). Upon switching to the business use mode, the base station device 200 refrains from the use of the frequency for use in communication with the business use application 103 for devices other than the mobile machine 100 for business use. The handover process may be, for example, of changing the frequency in use or moving the frequency in use to another base station device.

When the frequency corresponding to the business use application 103 included in the business use start request is not allocated, the base station device 200 determines that a business-use-dedicated route is absent, and transmits a business use start request to the communication route control device 500 (s13). The business use start request includes, for example, the application name of the business use application 103.

The communication route control device 500 receiving the business use start request creates a business-use-dedicated route (s14). Creating a business-use-dedicated route is performed by, for example, making an instruction for indicating to the switch 600 configuring the network 300 a communication route. Upon creating a business-use-dedicated route, the communication route control device 500 transmits a business-use-available notification to the base station device 200 (s15). The business-use-available notification includes, for example, the application name of the business use application 103.

Upon receiving the business-use-available notification, the base station device 200 switches to the business use mode (s16). For example, if the mode is already the business use mode at the time of receiving the business-use-available notification, the base station device 200 continues the business use mode as it is. The subsequent process is identical to the process when there is a business-use-dedicated route (s17 and s18).

<Process in Each Device>

Next, the process in each device is described in the order of the mobile machine 100, the base station device 200, and then communication route control device 500.

<1. Process in the Mobile Machine>

The process in the mobile machine 100 is described. As the process in the mobile machine 100, business use start, data transmission, and data reception are sequentially described in this order.

<1.1 At the Start of Business Use>

Figure 8:
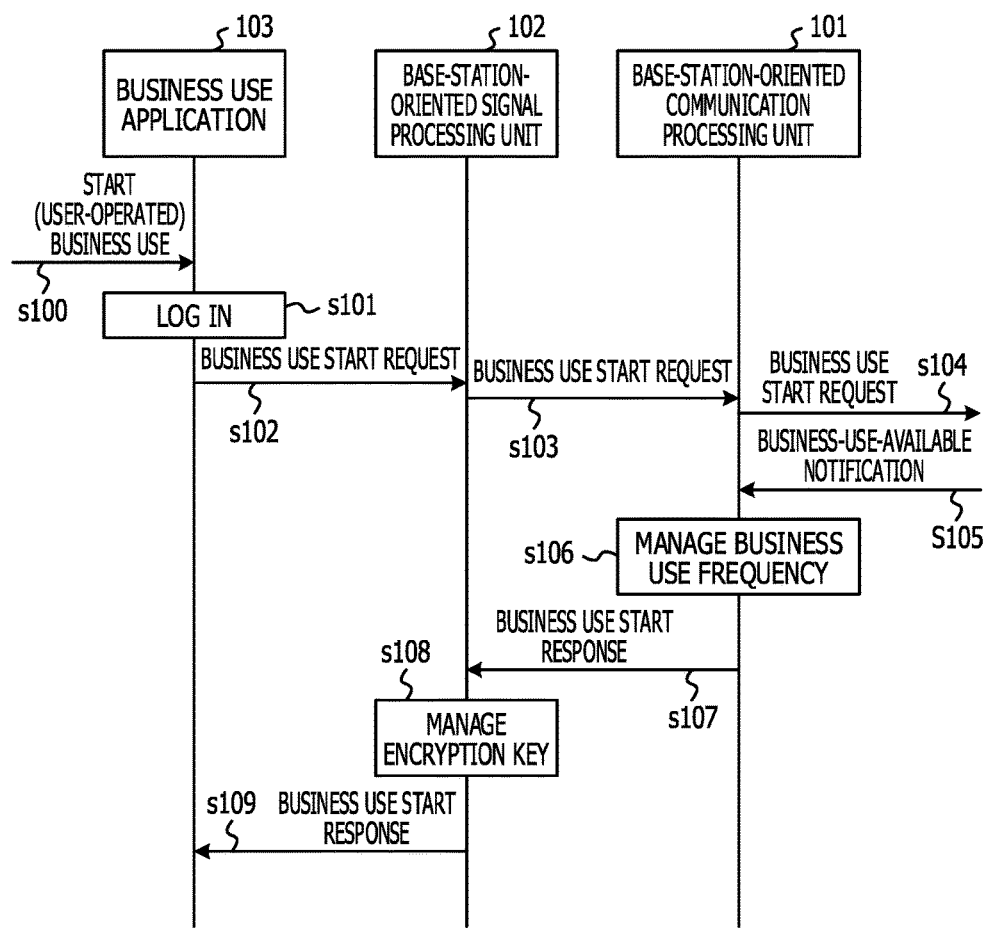
FIG. 8 is a diagram depicting an example of a sequence at the start of business use in the mobile machine.

The process at the start of business use in the mobile machine 100 is described. FIG. 8 is a diagram depicting an example of a sequence at the start of business use in the mobile machine 100.

For example, upon detection of a trigger for the start of business use by user operation (s100), the business use application 103 of the mobile machine 100 performs login process (s101). The login process is, for example, a process of displaying a login screen when the business use application 103 is started and requesting a user name, a password, and so forth. Unless login is normally performed, the process ends without proceeding to the subsequent process. When login process normally ends, the business use application 103 outputs a business use start request to the base-station-oriented signal processing unit 102 (s102). The business use start request includes, for example, the application name of the business use application 103 and the user name.

The base-station-oriented signal processing unit 102 changes the received business use start request into a format for transmission to the base station device 200, and outputs the resultant request to the base-station-oriented communication processing unit 101 (s103).

The base-station-oriented communication processing unit 101 converts the received business use start request into a radio signal, and transmits the radio signal to the base station device 200 (s104).

Upon receiving a business-use-available notification from the base station device 200 (s105), the base-station-oriented communication processing unit 101 manages a business use frequency (s106). The business-use-available notification includes, for example, information about the business use frequency indicating a frequency when the business use application 103 is used for communication, the application name of the business use application 103, and information about the encryption key. Managing the business use frequency is a process of, for example, obtaining the information about the business use frequency and the application name of the business use application 103 included in the received business-use-available notification and storing the obtained information and application name in a frequency information table (t1). FIG. 9 is a diagram depicting an example of the frequency information table (t1). Examples of information stored in the frequency information table (t1) are "use frequency (MHz)" and "application name". For example, "use frequency (MHz)" is a frequency for use when communication is performed by using the business use application 103 stored in "application name". In "use frequency (MHz)", a usable frequency range (namely, a usable frequency band) is stored, for example, "aaaa to bbbb". For example, "application name" is the application name of the business use application 103. The frequency information table (t1) is stored in, for example, an internal memory of the mobile machine 100. When management of the business use frequency ends, the base-station-oriented communication processing unit 101 outputs a business use start response to the base-station-oriented signal processing unit 102 (s107). The business use start response includes, for example, the application name of the business use application 103 and information about the encryption key.

Upon receiving the business use start response, the base-station-oriented signal processing unit 102 manages the encryption key (s108). Managing the encryption key is, for example, a process of obtaining the encryption key and the application name included in the business use start response and storing the obtained encryption key and application name in an encryption key information table (t2). FIG. 10 is a diagram depicting an example of the encryption key information table (t2). Examples of information stored in the encryption key information table (t2) are "encryption key" and "application name". For example, "encryption key" is an encryption key for use in encryption when communication is performed by using the business use application 103 stored in "application name". For example, "application name" is the application name of the business use application 103. The encryption key information table (t2) is stored in, for example, an internal memory of the mobile machine 100. When management of the encryption key ends, the base-station-oriented signal processing unit 102 outputs a business use start response to the business use application 103 (s109).

For example, after the business use start request is transmitted, the mobile machine 100 may prohibit the start of an application for communication with the base station device 200 other than the business use application 103. Also, for example, the mobile machine 100 may possess a plurality of different business use applications 103. Furthermore, the mobile machine 100 may impose a restriction so that a plurality of these different business use applications 103 are not started simultaneously.

<1.2 Data Transmission>

Figure 11:
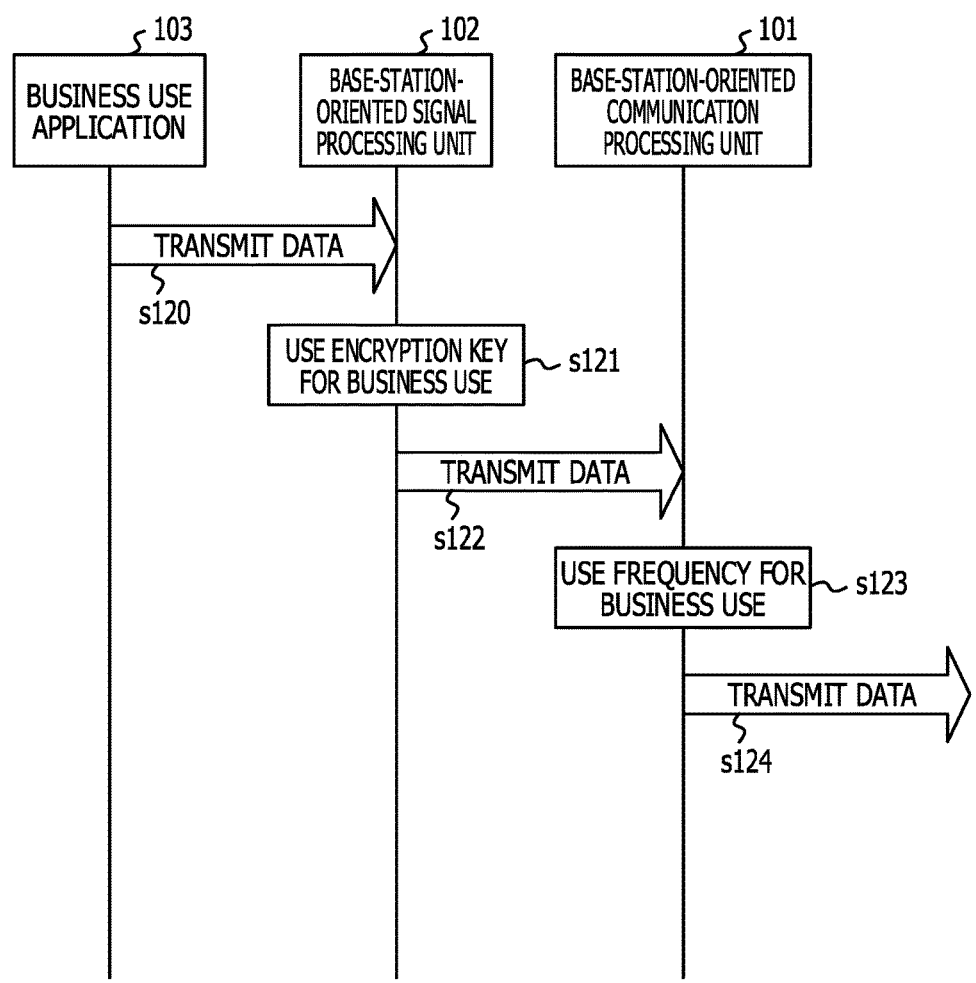
FIG. 11 is a diagram depicting an example of a sequence at the time of data transmission in the mobile machine.
Figure 12:
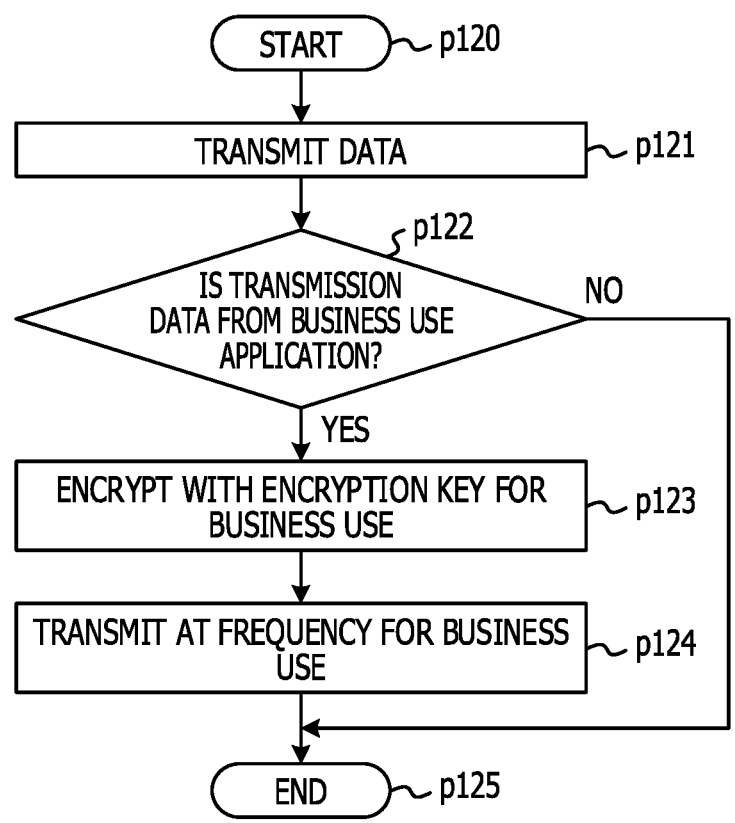
FIG. 12 is a diagram depicting an example of a process flow at the time of data transmission in the mobile machine.

Data transmission at the time of business use in the mobile machine 100 is described. FIG. 11 is a diagram depicting an example of a sequence of data transmission at the time of business use in the mobile machine 100. FIG. 12 is a diagram depicting an example of a process flow of data transmission at the time of business use in the mobile machine 100.

When transmitting data to the base station device 200 (p120), the business use application 103 transmits the data to the base-station-oriented signal processing unit 102 (s120 and p121). The data to be transmitted includes, for example, the application name of the business use application 103 as data transmission source information.

Upon receiving the data, the base-station-oriented signal processing unit 102 checks whether the data transmission source is the business use application 103 (p122). Data other than those from the business use application 103 is discarded (No at p122), and the process ends (p125).

When the data transmission source is the business use application 103 (Yes at p122), the base-station-oriented signal processing unit 102 uses the encryption key for business use (s121) to encrypt data (p123). Encryption is performed by, for example, obtaining an encryption key corresponding to the application name from the encryption key information table (t2). The base-station-oriented signal processing unit 102 transmits the encrypted data to the base-station-oriented communication processing unit 101 (s122).

Upon receiving the data, the base-station-oriented communication processing unit 101 uses the business use frequency (s123) to transmit the data to the base station device 200 (s124 and p124). The base-station-oriented communication processing unit 101 obtains, for example, a frequency corresponding to the business use application 103 from the frequency information table (t1) as a business use frequency.

<1.3 Data Reception>

Figure 13:
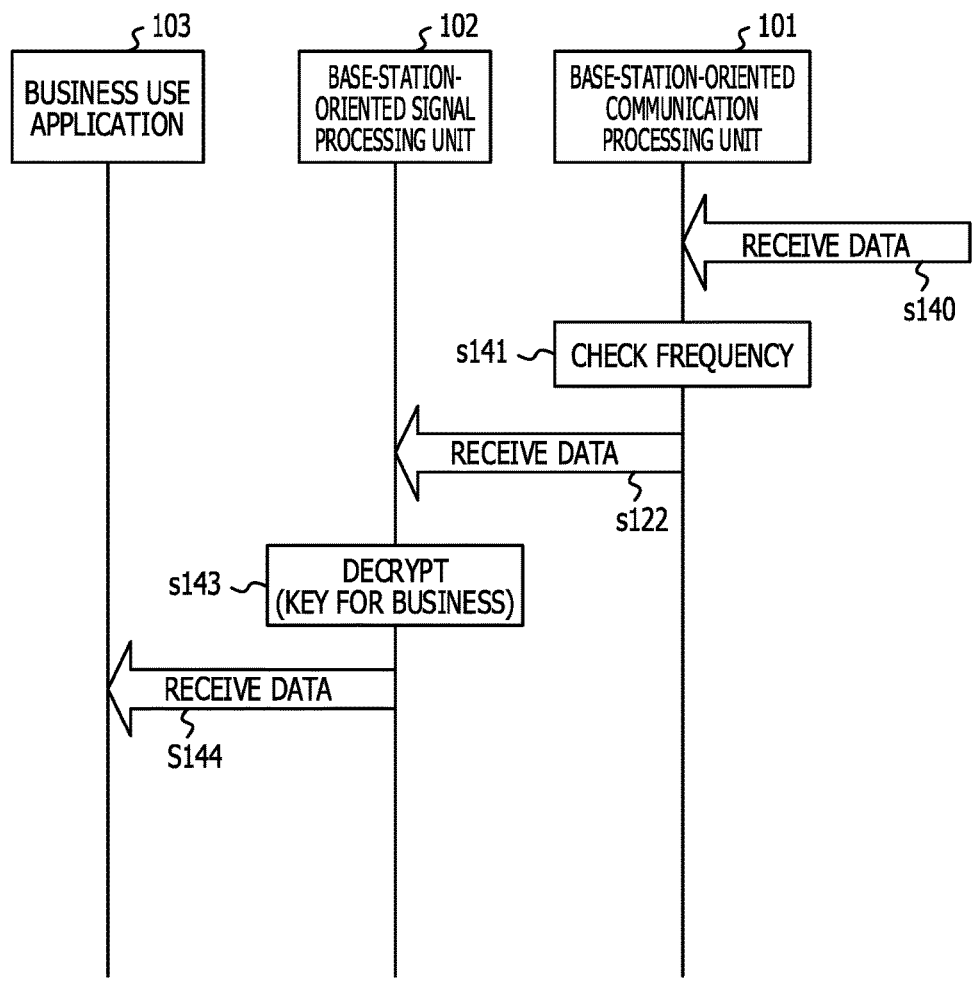
FIG. 13 is a diagram depicting an example of a sequence at the time of data reception in the mobile machine.
Figure 14:
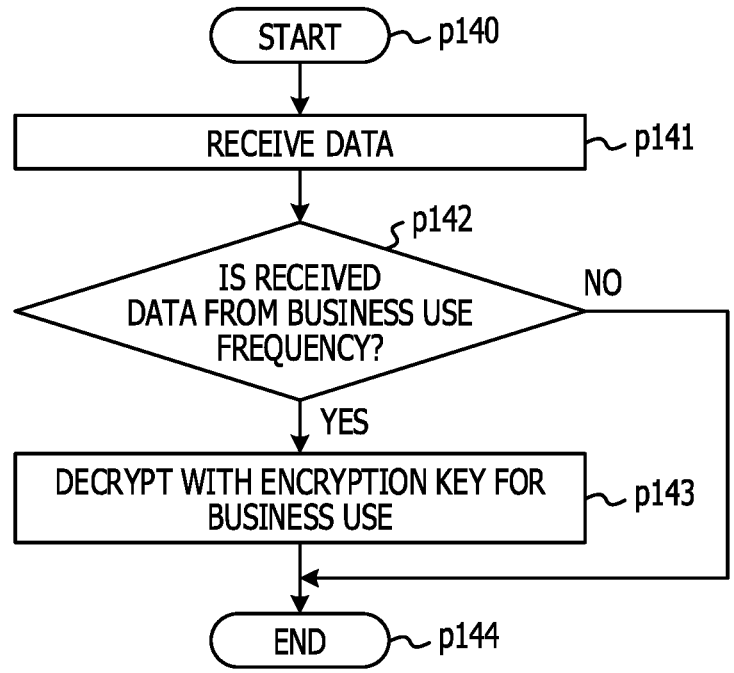
FIG. 14 is a diagram depicting an example of a process flow at the time of data reception in the mobile machine.

Data reception at the time of business use in the mobile machine 100 is described. FIG. 13 is a diagram depicting an example of a sequence of data reception at the time of business use in the mobile machine 100. FIG. 14 is a diagram depicting an example of a process flow of data reception at the time of business use in the mobile machine 100.

Upon receiving data from the base station device 200 (s140, p140, and p141), the base-station-oriented communication processing unit 101 checks the frequency of the received data (s141) to see whether the frequency is the business use frequency (p142). When the frequency of the received data is outside the frequency range stored in the frequency information table (t1) (No at p142), the base-station-oriented communication processing unit 101 discards the data, and ends the process (p144).

When the frequency of the received data is within the frequency range stored in the frequency information table (t1) (Yes at p142), the base-station-oriented communication processing unit 101 transmits the data to the base-station-oriented signal processing unit 102 (s142).

Upon receiving data, the base-station-oriented signal processing unit 102 obtains the encryption key from the encryption key information table (t2) and decrypts the data (s143 and p143). Upon decryption, the base-station-oriented signal processing unit 102 transmits the decrypted data to the business use application 103 (s144).

In this manner, when performing communication by using the business use application 103, the mobile machine 100 performs communication with the base station device 200 by using the business use frequency. By using different communication use frequencies between business use and other use purposes, data for business use and other data may not coexist in the same frequency. Also, by using different communication use frequencies between business use and other use purposes, for example, it becomes difficult for general users to pretend to be users of mobile machines for business use. That is, the probability of leakage of data used by the business use application is decreased, thereby improving security of the communication system 10.

<2. Process in the Base Station Device>

The process in the base station device 200 is described. As the process in the base station device 200, business use start and user deletion are sequentially described in this order.

<2.1 At the Start of Business Use>

Figure 15:
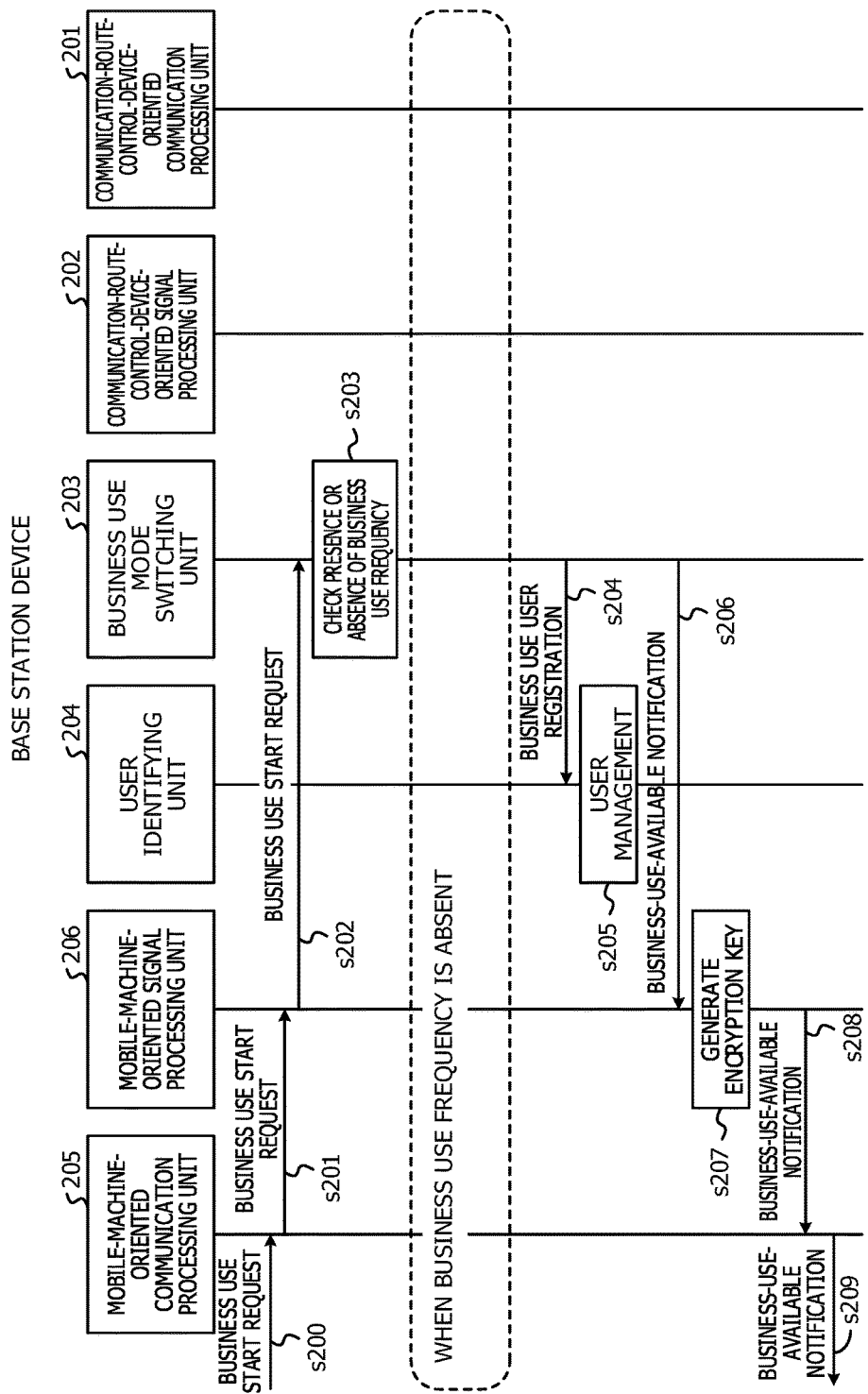
FIG. 15 is a diagram depicting an example of a sequence at the start of business use in the base station device.
Figure 16:
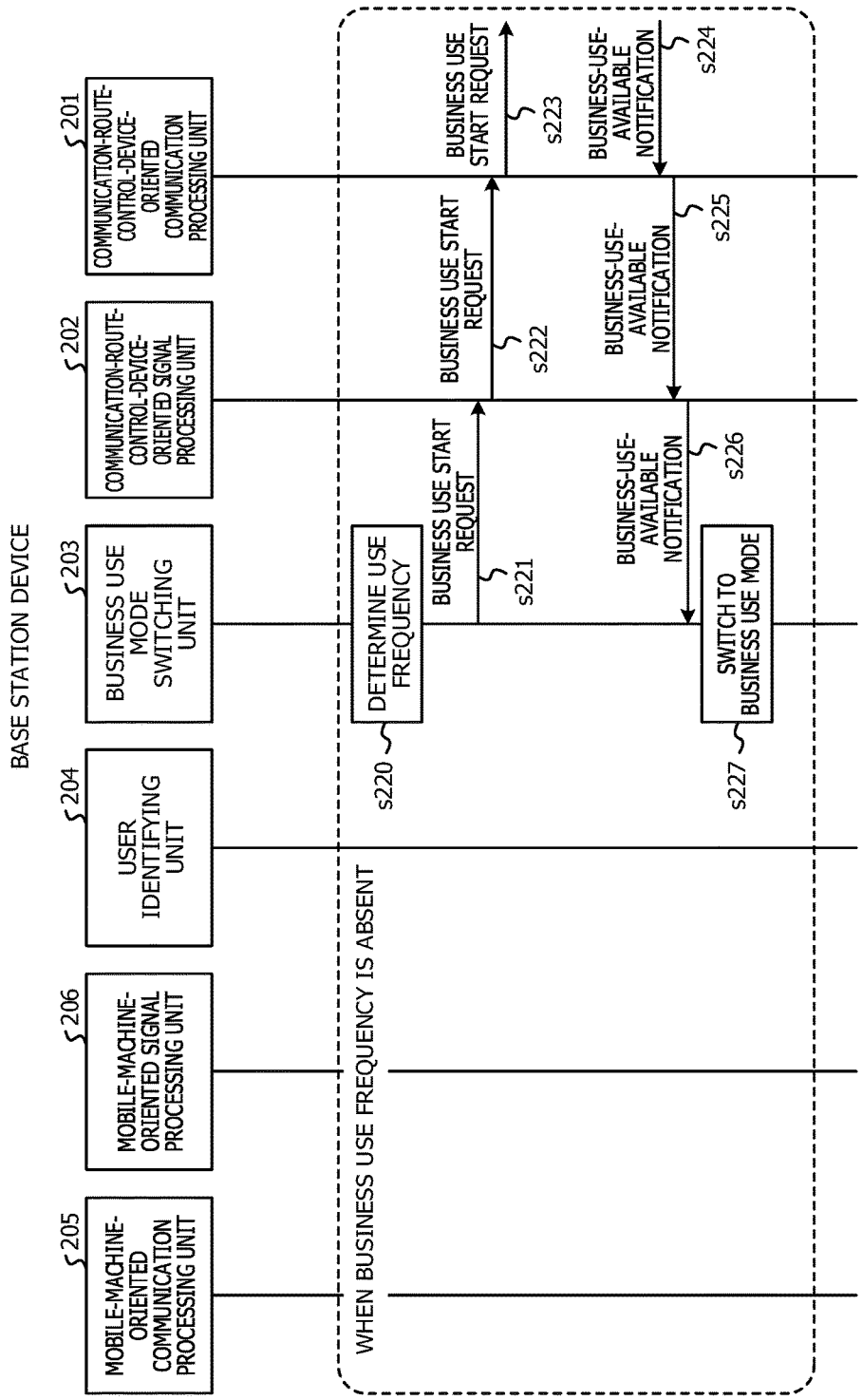
FIG. 16 is a diagram depicting an example of a sequence when a business use frequency is absent at the start of business use in the base station device.

The process at the start of business use in the base station device 200 is described. FIG. 15 is a diagram depicting an example of a sequence at the start of business use in the base station device 200. FIG. 16 is a diagram depicting an example of a sequence when a business use frequency is absent at the start of business use of the base station device 200.

Upon receiving a business use start request from the mobile machine 100 (s200), for example, the mobile-machine-oriented communication processing unit 205 performs demodulation process and frequency conversion process, and transmits a business use start request to the mobile-machine-oriented signal processing unit 206 (s201). Upon receiving the business use start request, for example, the mobile-machine-oriented signal processing unit 206 converts the received signal to a signal in an internal format, and transmits the business use start request to the business use mode switching unit 203 (s202).

Upon receiving the business use start request, the business use mode switching unit 203 checks the presence or absence of the business use frequency (s203). As a check method, for example, the business use mode switching unit 203 extracts the application name included in the business use start request, and checks to see whether the extracted application name is present in a frequency information table (t3). FIG. 17 is a diagram depicting an example of the frequency information table (t3). Examples of information stored in the frequency information table (t3) are "use frequency (MHz)" and "application name". For example, "use frequency (MHz)" is a frequency for use when communication is performed by using the business use application 103 stored in "application name". In "use frequency (MHz)", a usable frequency range is stored, for example, "aaaa to bbbb". For example, "application name" is the application name of the business use application 103. The frequency information table (t3) is stored in, for example, an internal memory of the base station device 200.

When the business use frequency is present, the business use mode switching unit 203 determines that the business-use-dedicated route is also present, and transmits a business use user registration to the user identifying unit 204 without sending a message to the communication route control device 500 (s204).

When a business use frequency is absent, the business use mode switching unit 203 requests the communication route control device 500 to create a business-use-dedicated route. The business use mode switching unit 203 determines a frequency for use in communication with the application included in the business use start request (s220). In an example of a frequency determination method, a frequency being used least by users or a predetermined frequency may be determined as a frequency for use. The business use mode switching unit 203 stores the determined frequency in the frequency information table (t3), and transmits a business use start request to the communication-route-control-device-oriented signal processing unit 202 (s221). Upon receiving the business use start request, the communication-route-control-device-oriented signal processing unit 202 converts the request into a format for transmission to the communication route control device 500, and transmits a business use start request to the communication-route-control-device-oriented communication processing unit 201 (s222). The communication-route-control-device-oriented communication processing unit 201 transmits the received business use start request to the communication route control device 500 (s223).

The communication-route-control-device-oriented communication processing unit 201 transmits a business-use-available notification received from the communication route control device 500 (s224) to the communication-route-control-device-oriented signal processing unit 202 (s225). The business-use-available notification includes, for example, the application name of the business use application 103. Upon receiving the business-use-available notification, the communication-route-control-device-oriented signal processing unit 202 converts the notification into a signal in an internal format, and transmits the business-use-available notification to the business use mode switching unit 203 (s226).

Upon receiving the business-use-available notification, the business use mode switching unit 203 switches to the business use mode (s227). If the mode is already the business use mode at the time of receiving the business-use-available notification, the business use mode switching unit 203 continues the business use mode. After switching to the business use mode, the business use mode switching unit 203 transmits a business use user registration to the user identifying unit 204 (s204).

After the business use mode switching unit 203 transmits the business use user registration to the user identifying unit 204, the same process applies irrespectively of the presence or absence of a business use frequency.

Upon receiving the business use user registration, the user identifying unit 204 performs user management (s205). User management is a process of, for example, extracting the identifier and the application name included in the business use start request and storing the identifier and the application name in a user information table (t4). FIG. 18 is a diagram depicting an example of the user information table (t4). Examples of information stored in the user information table (t4) are "user" and "application name". For example, "user" is an identifier of the mobile machine 100 for communication using the business use application 103 stored in "application name". The identifier may be, for example, an application login name or the IMEI of the mobile machine 100. For example, "application name" is the application name of the business use application 103. The user information table (t4) is stored in, for example, an internal memory of the base station device 200. If the application name is already present in the user information table (t4), the user identifying unit 204 additionally stores "user". If the application name is not present in the user information table (t4), the user identifying unit 204 adds "application name", and also additionally stores the relevant "user".

When transmitting the business use user registration, the business use mode switching unit 203 puts information about the frequency usable by the mobile machine 100 on a business-use-available notification, and transmits the notification to the mobile-machine-oriented signal processing unit 206 (s206). Upon receiving the business-use-available notification, the mobile-machine-oriented signal processing unit 206 generates an encryption key (s207). The encryption key is an encryption key for use in communication with the mobile machine 100, and is generated for each application. The mobile-machine-oriented signal processing unit 206 stores the generated encryption key in an encryption key information table (t5). FIG. 19 is a diagram depicting an example of the encryption key information table (t5). Examples of information stored in the encryption key information table (t5) are "encryption key" and "application name". For example, "encryption key" is an encryption key for use in encrypting data to be transmitted and received in communication with the mobile machine 100 for communication using the business use application 103 stored in "application name". For example, "application name" is the application name of the business use application 103. The encryption key information table (t5) is stored in, for example, an internal memory of the base station device 200.

Upon generating an encryption key, the mobile-machine-oriented signal processing unit 206 puts the encryption key on the business-use-available-notification, and transmits the notification to the mobile-machine-oriented communication processing unit 205 (s208). The mobile-machine-oriented communication processing unit 205 performs modulation process and frequency conversion process on the received business-use-available notification, and transmits the result to the mobile machine 100 (s209).

In this manner, the base station device 200 allocates the business use frequency to the mobile machine 100 for communication using the business use application 103. With the base station device 200 allocating the business use frequency, the mobile machine 100 may perform communication without being aware of business use or normal use. When the base station device 200 does not allocate the business use frequency, in an example of a method, a frequency at the time of using the business use application 103 is determined between the mobile machine 100 and the base station device 200 and is stored in an internal memory or the like. In this method, for example, a process of changing the frequency for use for each application is added to the mobile machine 100.

<2.2 User Deletion>

Figure 20:
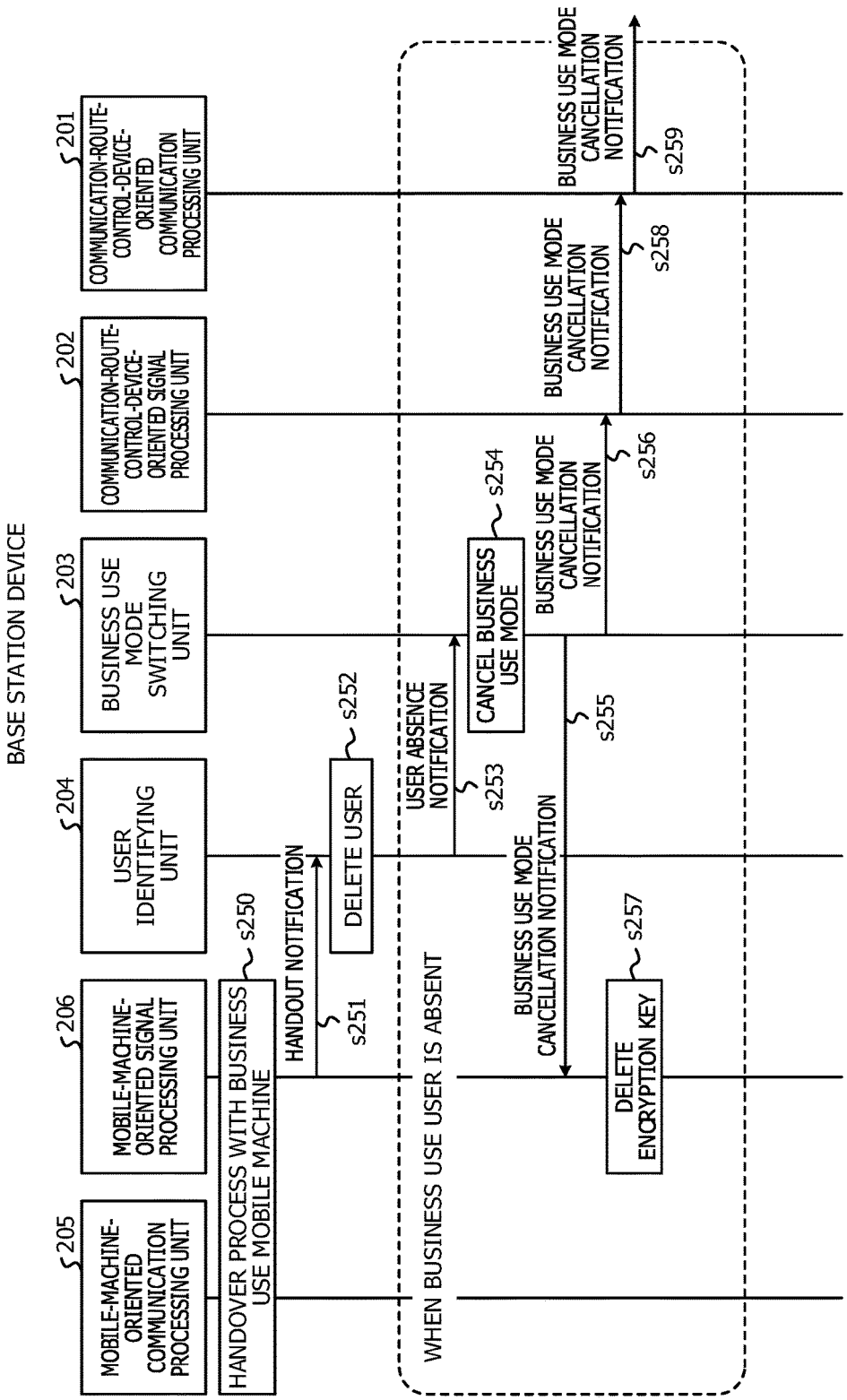
FIG. 20 is a diagram depicting an example of a sequence at the time of user deletion in the base station device.

The process at the time of user deletion in the base station device 200 is described. FIG. 20 is a diagram depicting an example of a sequence at the time of user deletion in the base station device 200.

When detecting that the mobile machine 100 for business use has made a handover (s250), the mobile-machine-oriented signal processing unit 206 transmits a handout notification including the identifier of the handed-over mobile machine 100 to the user identifying unit 204 (s251). Note that the mobile-machine-oriented signal processing unit 206 performs similar process also in cases other than the case of detecting a handover, for example, when a disconnection is detected and when the use of business use application 103 ends. Also, for example, the mobile-machine-oriented signal processing unit 206 may manage communication with the mobile machine 100 by using a timer or the like and, when data transmission and reception is not performed for a predetermined time, may determine that communication with the mobile machine 100 has been disconnected and may perform process similar to the process at the time of handover detection.

Upon receiving the handout notification, the user identifying unit 204 performs user deletion (s252). User deletion is a process of, for example, deleting a user relevant to the identifier included in the handout notification from the user information table (t4).

As a result of user deletion, when no user for the relevant application is present, the user identifying unit 204 requests the communication route control device 500 to free the business-use-dedicated route. The user identifying unit 204 transmits a user absence notification to the business use mode switching unit 203 (s253). The user absence notification includes, for example, the application name of the business use application 103. Upon receiving the user absence notification, when no business use is performed also in other applications, the business use mode switching unit 203 cancels the business use mode (s254). After cancelling the business use mode, the business use mode switching unit 203 transmits a business use mode cancellation notification to the mobile-machine-oriented signal processing unit 206 and the communication-route-control-device-oriented signal processing unit 202 (s255 and s256). The business use mode cancellation notification includes, for example, the application name.

Upon receiving the business use mode cancellation notification, the mobile-machine-oriented signal processing unit 206 deletes the encryption key corresponding to the application included in the business use mode cancellation notification from the encryption key information table (t5) (s257).

Upon receiving the business use mode cancellation notification, the communication-route-control-device-oriented signal processing unit 202 changes a format for transmission to the communication route control device 500, and transmits the format-changed notification to the communication-route-control-device-oriented communication processing unit 201 (s258). Upon receiving the business use mode cancellation notification, the communication-route-control-device-oriented communication processing unit 201 transmits the notification to the communication route control device 500 (s259).

The base station device 200 manages the mobile machine 100 in business use and, when no mobile machine 100 in business use is present, returns to normal operation. With this, the base station device 200 minimizes the possibility of occupying frequencies for business use even though the mobile machine 100 for business use is not present, and shortens the time of restriction on frequencies usable by general users as much as possible, thereby allowing effective use of wireless resources.

<3. Process in the Communication Route Control Device>

The process in the communication route control device 500 is described. As the process in the communication route control device 500, business use start and business use end are sequentially described in this order.

<3.1 At the Start of Business Use>

Figure 21:
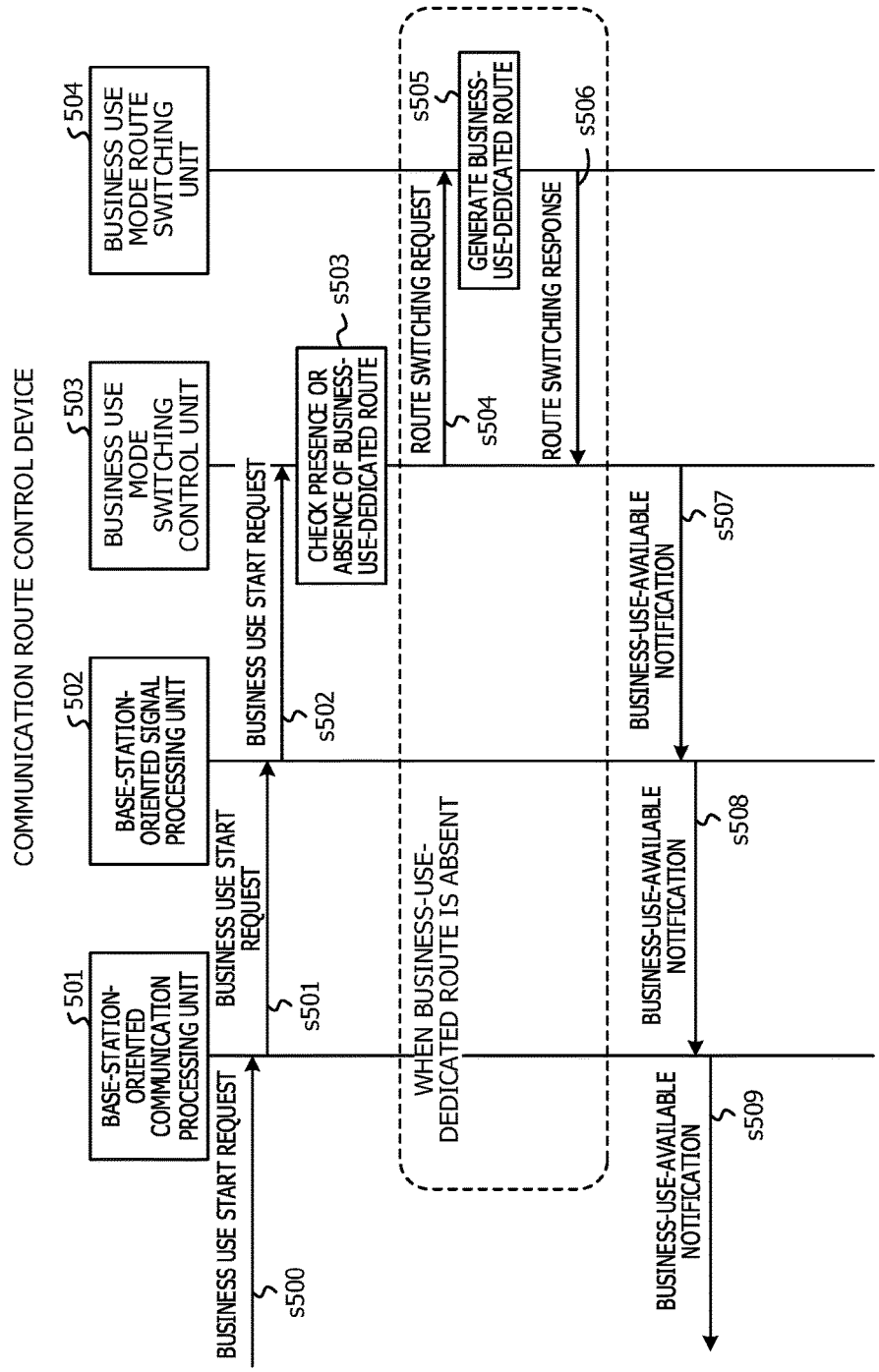
FIG. 21 is a diagram depicting an example of a sequence at the start of business use in the communication route control device.

The process at the start of business use in the communication route control device 500 is described. FIG. 21 is a diagram depicting an example of a sequence at the start of business use in the communication route control device 500.

Upon receiving a business use start request from the base station device 200 (s500), the base-station-oriented communication processing unit 501 transmits the request to the base-station-oriented signal processing unit 502 (s501). The base-station-oriented signal processing unit 502 converts the received business use start request into an internal format, and transmits the request to the business use mode switching control unit 503 (s502).

Figure 23:
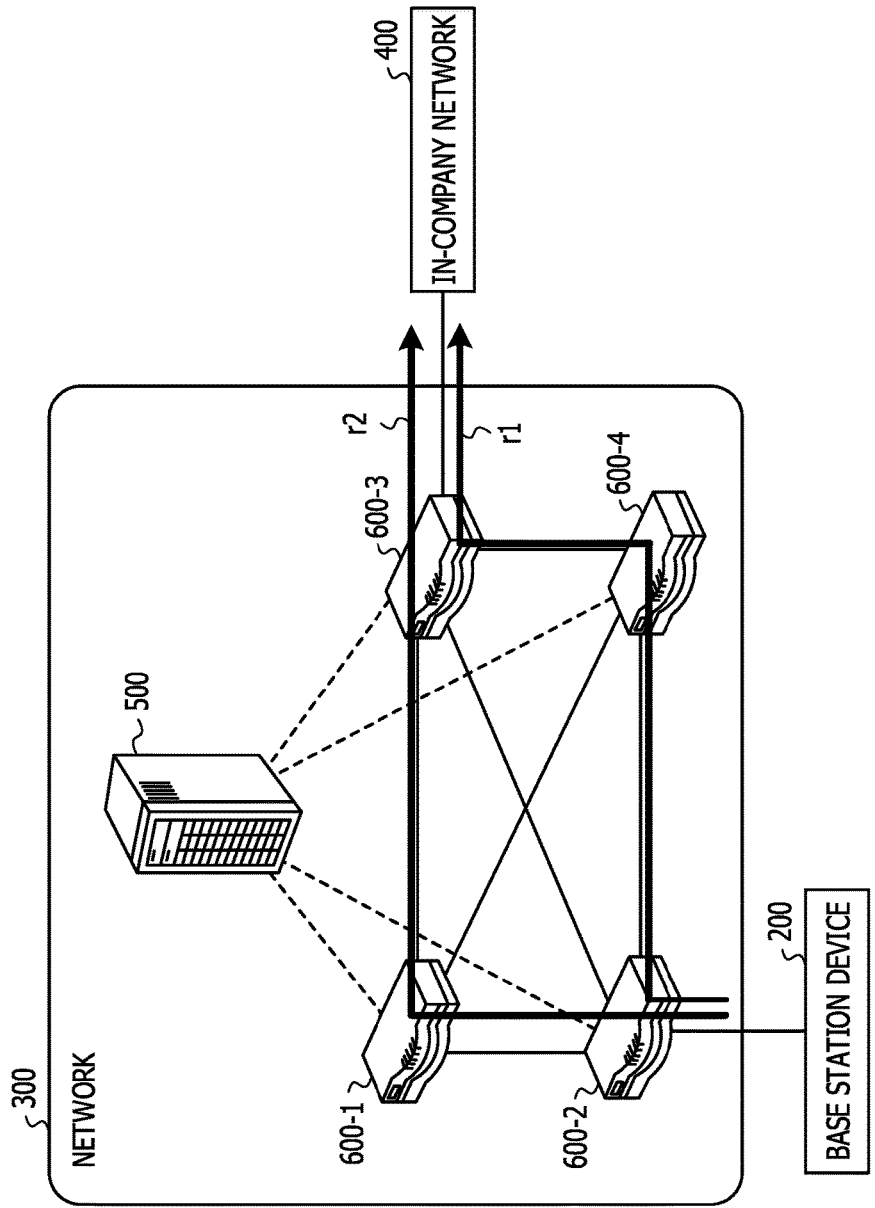
FIG. 23 is a diagram depicting an example of communication routes in a network.

Upon receiving the business use start request, the business use mode switching control unit 503 checks the presence or absence of a business-use-dedicated route (s503). The presence or absence of business use is checked by referring to a route information table (t6) to see whether a business-use-dedicated route corresponding to the application name included in the business use start request is present. FIG. 22 is a diagram depicting an example of the route information table (t6). Examples of information stored in the route information table (t6) are "route information", "application name", and "in-company network address". For example, "route information" is a business-use-dedicated route for communication by using the business use application 103 stored in "application name". The business-use-dedicated route is configured by, for example, instructing the switch 600 configuring the network 300. The business-use-dedicated route indicates, for example, through which switch 600 the packet received from the base station device 200 is sent to the in-company network 400. FIG. 23 is a diagram depicting an example of communication routes in the network 300. For example, "route 1" in FIG. 22 is a communication route indicated by an arrow r1 in FIG. 23, and "route 2" in FIG. 22 is a communication route indicated by an arrow r2 in FIG. 23. For example, "application name" is the application name of the business use application 103. For example, "in-company network address" is a connection destination address in the in-company network 400 corresponding to "application name". For example, "in-company network address" is an Internet protocol (IP) address. The route information table (t6) is stored in, for example, an internal memory of the communication route control device 500.

When a business-use-dedicated route corresponding to the application name included in the business use start request is absent, the business use mode switching control unit 503 transmits a route switching request to the business use mode route switching unit 504 (s504). The route switching request includes, for example, an in-company network address as a connection destination.

Upon receiving the route switching request, the business use mode route switching unit 504 generates a business-use-dedicated route (s505). A business-use-dedicated route is generated by, for example, instructing the switch 600. When generation of a business-use-dedicated route ends, the business use mode route switching unit 504 transmits a route switching response to the business use mode switching control unit 503 (s506). The route switching response includes, for example, the application name and route information.

Upon receiving the route switching information, the business use mode switching control unit 503 stores the route information in the route information table (t6).

The business use mode switching control unit 503 transmits a business-use-available notification to the base-station-oriented signal processing unit 502 (s507). The business-use-available notification includes, for example, the application name. Upon receiving the business-use-available notification, the base-station-oriented signal processing unit 502 converts a format of the notification for transmission to the base station device 200, and transmits the format-converted notification to the base-station-oriented communication processing unit 501 (s508). Upon receiving the business-use-available notification, the base-station-oriented communication processing unit 501 transmits the business-use-available notification to the base station device 200 (s509).

In this manner, the communication route control device 500 generates a communication route dedicated for each application. With this, a dedicated route from the base station device 200 to the in-company network 400 may be ensured, and coexistence with general user data may be reduced. With reduction of coexistence with general users, leakage of data in business use to general users and interception by general users may be reduced, thereby improving security.

<3.2 At the End of Business Use>

Figure 24:
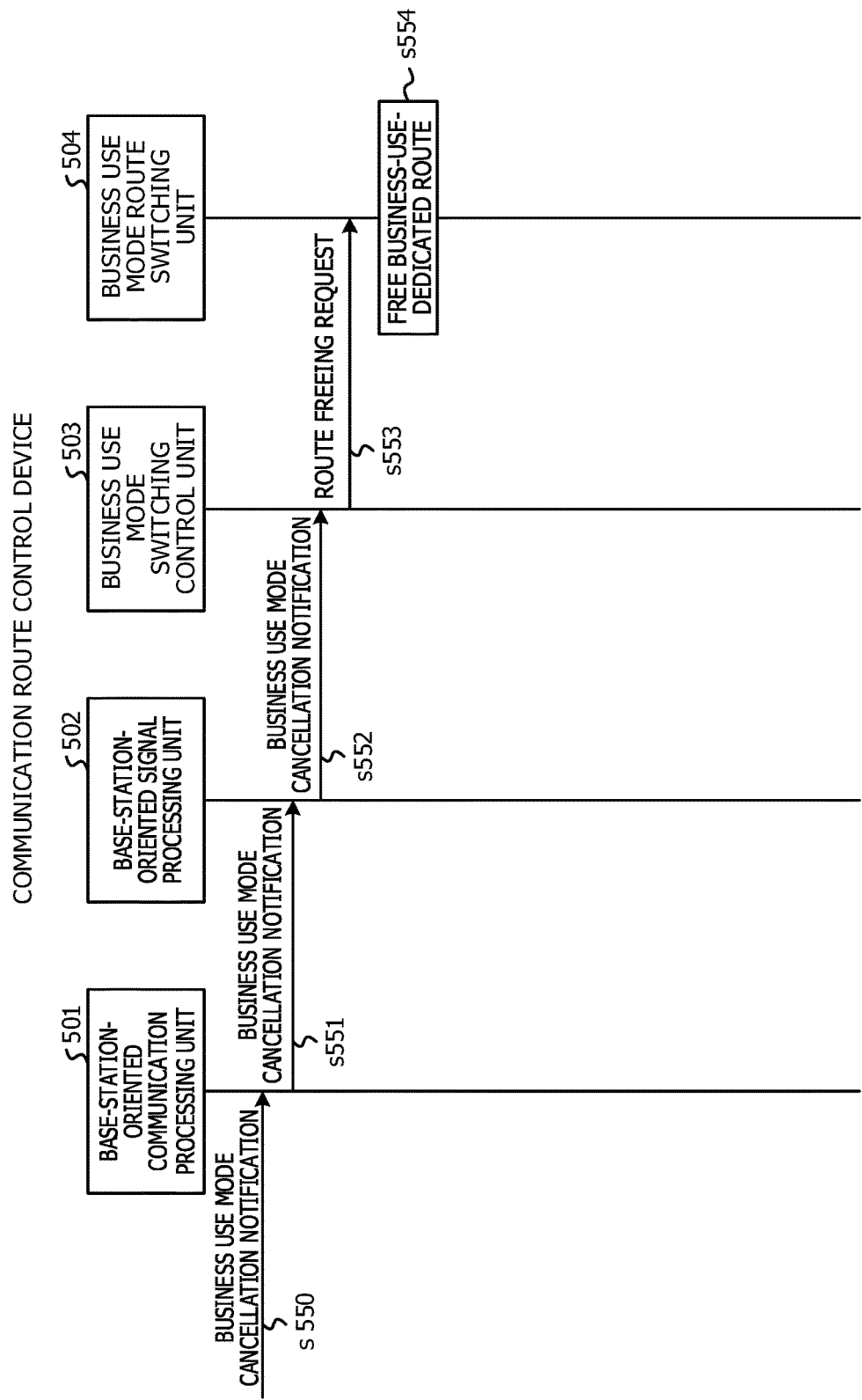
FIG. 24 is a diagram depicting an example of a sequence at the end of business use in the communication route control device.

The process at the end of business use in the communication route control device 500 is described. FIG. 24 is a diagram depicting an example of a sequence at the end of business use in the communication route control device 500.

Upon receiving a business use mode cancellation notification (s550), the base-station-oriented communication processing unit 501 transmits the notification to the base-station-oriented signal processing unit 502 (s551). Upon receiving the business use mode cancellation notification, the base-station-oriented signal processing unit 502 converts the notification into an internal format, and transmits the notification to the business use mode switching control unit 503 (s552).

Upon receiving the business use mode cancellation notification, the business use mode switching control unit 503 transmits a route freeing request to the business use mode route switching unit 504 (s553). The route freeing request includes, for example, the application name and an in-company network address as targets for which the business-use-dedicated route is freed.

Upon receiving the route freeing request, the business use mode route switching unit 504 frees the business-use-dedicated route (s554). Freeing the business-use-dedicated route is, for example, to free the business-use-dedicated route corresponding to the application name and the in-company network address included in the route freeing request. For example, the business use mode route switching unit 504 frees the business-use-dedicated route by instructing the switch 600 forming the business-use-dedicated route. When freeing the business-use-dedicated route ends, the business use mode route switching unit 504 deletes route information corresponding to the application name included in the business use mode cancellation notification from the route information table (t6).

When the base station device 200 cancels the business use mode, the communication route control device 500 frees the business-use-dedicated route. With this, the communication route control device 500 minimizes the possibility of occupying lines for business use even though the mobile machine 100 for business use is not present, and shortens the time of restriction on lines usable by general users as much as possible, thereby allowing effective use of resources.

Other Embodiments

Other embodiments are described.

<Example of Hardware Structure of the Mobile Device>

Figure 25:
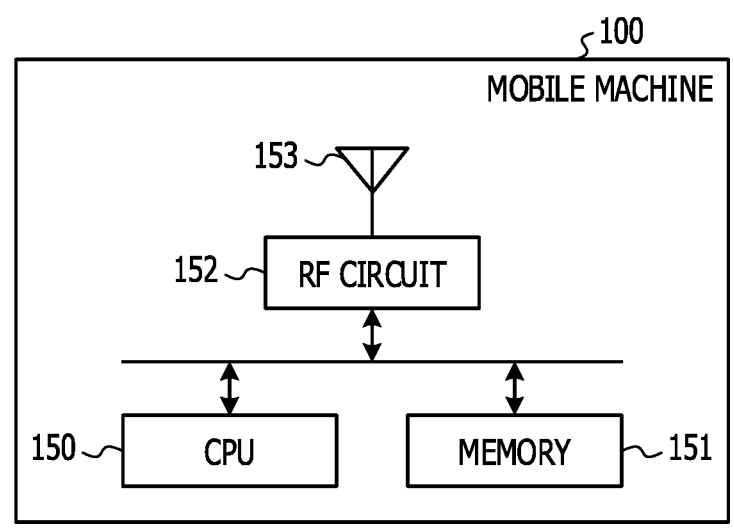
FIG. 25 is a diagram depicting an example of hardware structure of the mobile machine.

An example of hardware structure of the mobile machine 100 is described. FIG. 25 is a diagram depicting an example of hardware structure of the mobile machine 100.

The mobile machine 100 includes a central processing unit (CPU) 150, a memory 151, a radio frequency (RF) circuit 152, and an antenna 153.

For example, the CPU 150 executes a program loaded onto the memory 151. The CPU 150 is, for example, the base-station-oriented communication processing unit 101, the base-station-oriented signal processing unit 102, and the business use application 103 in the second embodiment. The CPU 150 may be a processor or controller such as, for example, a micro processing unit (MPU) or field programmable gate array (FPGA).

The memory 151 is, for example, an internal memory of the mobile machine 100. For example, the memory 151 stores therein the frequency information table (t1) and the encryption key information table (t2) in the second embodiment.

For example, the RF circuit 152 receives a radio signal received at the antenna 153, converts the signal into an internal format, and outputs the resultant signal to the CPU 150 and the memory 151. The RF circuit 152 is, for example, the base-station-oriented communication processing unit 101 in the second embodiment.

The antenna 153 wirelessly transmits and receives a packet to and from, for example, the base station device 200.

<Example of Hardware Structure of the Base Station Device>

Figure 26:
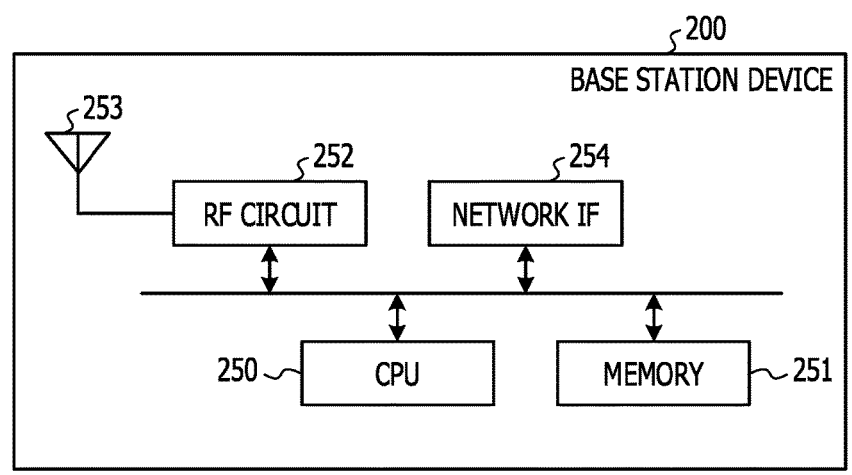
FIG. 26 is a diagram depicting an example of hardware structure of the base station device.

An example of hardware structure of the base station device 200 is described. FIG. 26 is a diagram depicting an example of hardware structure of the base station device 200.

The base station device 200 includes a CPU 250, a memory 251, an RF circuit 252, an antenna 253, and a network IF 254.

For example, the CPU 250 executes a program loaded onto the memory 251. The CPU 250 is, for example, the communication-route-control-device-oriented communication processing unit 201, the communication-route-control-device-oriented signal processing unit 202, the business use mode switching unit 203, the user identifying unit 204, the mobile-machine-oriented communication processing unit 205, and the mobile-machine-oriented signal processing unit 206 in the second embodiment. The CPU 250 may be a processor or controller such as, for example, an MPU or FPGA.

The memory 251 is, for example, an internal memory of the base station device 200. For example, the memory 251 stores therein the frequency information table (t3), the user information table (t4), and the encryption key information table (t5) in the second embodiment.

For example, the RF circuit 252 receives a radio signal received at the antenna 253, converts the signal into an internal formant, and outputs the resultant signal to the CPU 250 and the memory 251. The RF circuit 252 is, for example, the mobile-machine-oriented communication processing unit 205 in the second embodiment.

The antenna 253 wirelessly transmits and receives a packet to and from, for example, the mobile machine 100.

For example, the network IF 254 transmits and receives a packet and command to and from the communication route control device 500. The network IF 254 is, for example, the communication-route-control-device-oriented communication processing unit 201 in the second embodiment.

<Example of Hardware Structure of the Communication Route Control Device>

Figure 27:
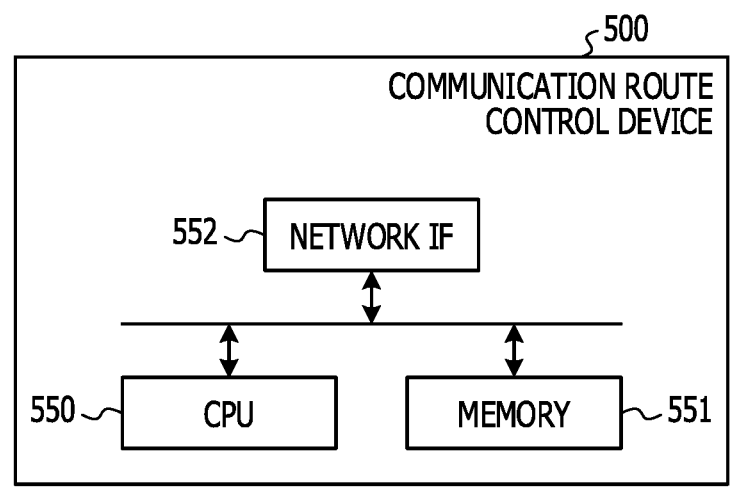
FIG. 27 is a diagram depicting an example of hardware structure of the communication route control device.

An example of hardware structure of the communication route control device 500 is described. FIG. 27 is a diagram depicting an example of hardware structure of the communication route control device 500.

The communication route control device 500 includes a CPU 550, a memory 551, and a network IF 552.

For example, the CPU 550 executes a program loaded onto the memory 551. The CPU 550 is, for example, the base-station-oriented communication processing unit 501, the base-station-oriented signal processing unit 502, the business use mode switching control unit 503, and the business use mode route switching unit 504 in the second embodiments. The CPU 550 may be a processor or controller such as, for example, an MPU or FPGA.

The memory 551 is, for example, an internal memory of the communication route control device 500. For example, the memory 551 stores therein the route information table (t6) in the second embodiment.

For example, the network IF 552 transmits and receives a packet and command to and from the base station device 200. The network IF 552 is, for example, the base-station-oriented communication processing unit 501 in the second embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
    a terminal; and
    a base station configured to wirelessly communicate with the terminal using a first frequency band so as to couple the terminal to an access destination using a first wireless communication protocol,
    wherein a second frequency band is used for wirelessly communicating between the base station and the terminal instead of the first frequency band, only when a specified application program executed in the terminal communicates only through a specified network via the base station so as to couple the terminal to the access destination using the first wireless communication protocol.

2. A base station comprising:
    a memory; and
    a processor coupled to the memory and configured to wirelessly communicate with a terminal using a first frequency band so as to couple the terminal to an access destination using a first wireless communication protocol, wherein a second frequency band is used for wirelessly communicating between the base station and to the terminal instead of the first frequency band, only when a specified application program executed in the terminal communicates only through a specified network via the base station so as to couple the terminal to the access destination using the first wireless communication protocol.

3. The base station according to claim 2, wherein the processor is further configured to notify the first frequency band and the second frequency band to the terminal.

4. The base station according to claim 2, wherein the specified application program is an application program allowed to be used for the terminal.

5. The base station according to claim 2, wherein an encryption key for communication between the specified application program and the base station is different from each encryption key for each communication between each of one or more other application programs and the base station.

6. The base station according to claim 2, wherein the processor is further configured to receive information indicating a specified route from a control apparatus, the specified route being a route between the base station and the specified network.

7. The base station according to claim 2, wherein the processor is further configured, when another terminal wirelessly coupled to the base station using the first frequency band or the second frequency band, to stop the another terminal from using the first frequency band and the second frequency band.

8. The base station according to claim 2, wherein the processor is further configured, when another terminal wirelessly coupled to the base station using the first frequency band or the second frequency band, to control the terminal to handover to another base station or to use a third frequency band.

9. The base station according to claim 2, wherein the second frequency band is associated with the specified application program.

10. The base station according to claim 2, wherein the second frequency band is associated with the specified network of the plurality of networks.

11. A terminal comprising: a memory; and a processor coupled to the memory and configured to wirelessly communicate with a base station using a first frequency band so as to couple the terminal to an access destination using a first wireless communication protocol, wherein a second frequency band is used for wirelessly communicating between the base station and to the terminal instead of the first frequency band, only when a specified application program executed in the terminal communicates only through a specified network via the base station so as to couple the terminal to the access destination using the first wireless communication protocol.

* * * * *